United States Patent [19]

Tanaka et al.

[11] Patent Number: 4,538,042
[45] Date of Patent: Aug. 27, 1985

[54] METHOD AND APPARATUS FOR FORMING REINFORCING CAGE FOR PRESTRESSED CONCRETE PILE

[75] Inventors: Masaho Tanaka, Yokohama; Tomio Shishido, Ibaragi; Tetsukazu Fukuhara, Hiratsuka; Yugo Yao, Hiratsuka; Kunihilo Kobayashi, Hiratsuka; Yoshio Inoue, Chigasaki, all of Japan

[73] Assignees: Neturen Co., Ltd., Tokyo; Asahi Kasei Kogyo Kabushiki Kaisha, Osaka; Asahi Kasei Kogyo Kabushiki Hiraoka & Co., Tokyo, all of Japan

[21] Appl. No.: 381,761

[22] Filed: May 25, 1982

[51] Int. Cl.³ .............................................. B23K 11/32
[52] U.S. Cl. ......................................... 219/58; 219/56; 219/110
[58] Field of Search ................... 219/109, 110, 58, 56, 219/62

[56] References Cited

U.S. PATENT DOCUMENTS 3,621,193  11/1971  Low .................................. 219/109 X
4,242,561  12/1980  Long .................................. 219/109

FOREIGN PATENT DOCUMENTS 1089  1/1971  Japan .................................. 219/62

Primary Examiner—Roy N. Envall, Jr.
Assistant Examiner—Alfred S. Keve
Attorney, Agent, or Firm—Finnegan, Henderson, Farabow, Garrett & Dunner

[57] ABSTRACT

Apparatus and method for forming a reinforcing cage for a prestressed concrete pile, in which the cage includes a set of main steel bars arranged in a circular pattern and an auxiliary wire which is helically wound around and welded at its crossings with the steel bars, that prevents any crossings from being welded when the current for welding is either insufficient in magnitude or not present and that prevents any unwelded crossings from being subsequently tempered.

5 Claims, 38 Drawing Figures

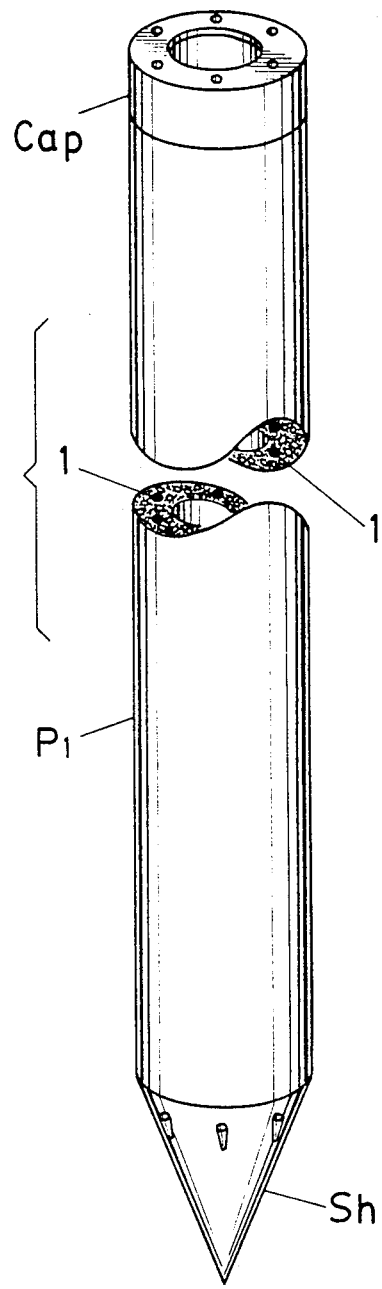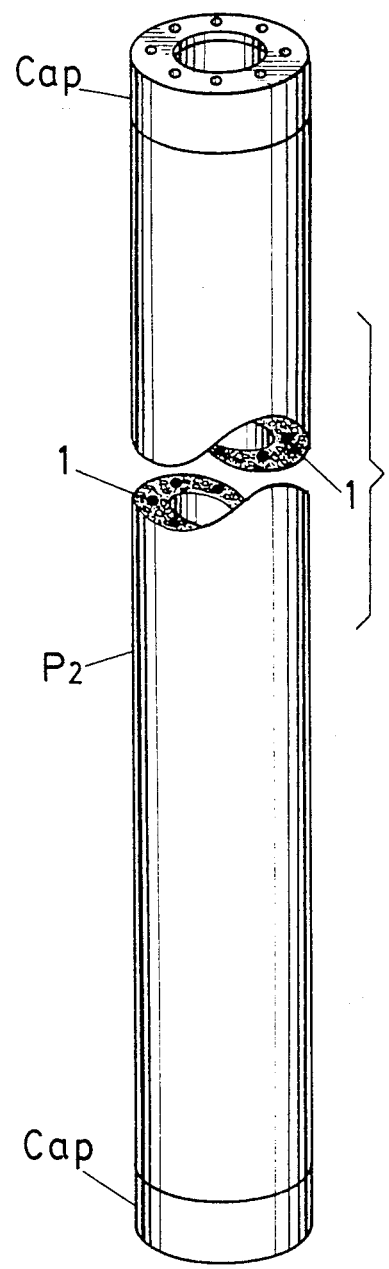

FIG.2 (b) PRIOR ART

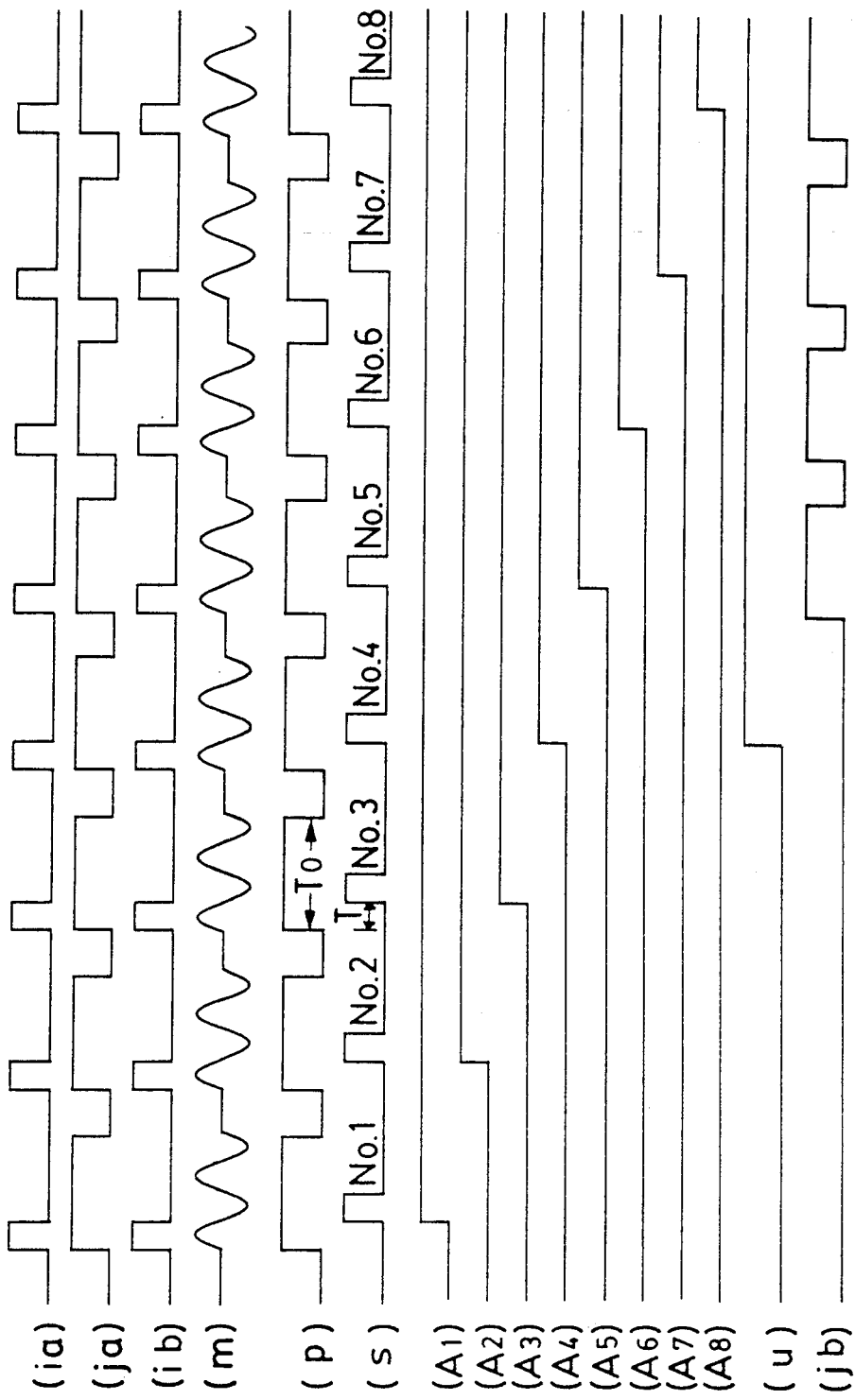

METHOD AND APPARATUS FOR FORMING REINFORCING CAGE FOR PRESTRESSED CONCRETE PILE

BACKGROUND OF THE INVENTION

The invention relates to a method of and an apparatus for forming a reinforcing cage which is to be embedded, as a structural member, in a prestressed concrete pile.

A reinforcing cage for such prestressed concrete pile may be formed by an arrangement including a stationary cylindrical electrode of a given diameter, a welding electrode disposed for angular movement around the outer periphery of the stationary electrode while maintaining a small clearance therebetween, and a temper electrode which is arranged in the similar manner as the welding electrode. The arrangement is operated so that a plurality of main members or steel bars are brought into surrounding relationship with the peripheral surface of the stationary electrode while maintaining a mutually parallel relationship, and an auxiliary member is sequentially wound, in a helical form, around the outer periphery of the set of main members, with the crossings between the main and the auxiliary members being welded and tempered by an electrical resistance heating which occurs upon passing an electrical current through the stationary electrode on one hand and the welding electrode and the temper electrode, respectively, on the other, with the crossings interposed therebetween. If the welds or crossings are not positively tempered, a degradation in the mechanical properties occur in the main members in the region of the crossings. In the event that there is a high likelihood that such degradation may occur, the welding operation had better be avoided. In recognition of this, the invention provides a method of and an apparatus for forming a reinforcing cage in which during the initial phase of energization or passing the welding current, a detection is made whether the crossings are properly energized to enable a positive welding. If it is determined that the energizing condition is such as to enable a positive welding operation, the energization is continued to permit the welding current of a controlled magnitude to be supplied. Otherwise, the energization is interrupted to avoid the welding operation. The fact that the crossings between the main and the auxiliary members are positively welded is stored, thereby allowing a subsequent tempering operation by passing a tempering current of a controlled magnitude through the crossings which have already been welded in a positive manner. In this manner, a positive tempering operation is assured while avoiding the application of the tempering current through the crossings which have not been welded. The reinforcing cage is thus formed in a sequential manner while avoiding any degradation in the strength of the main members in the region of the welds or crossings.

According to another aspect of the invention, there is provided an apparatus for forming a reinforcing cage in which upon starting the apparatus, the speed of rotation of a rotary electrode is synchronized with the speed of winding an auxiliary member around a circle of main members. Guide bars are disposed on the outer periphery of the stationary electrode so that the force by the rotary electrode is properly applied to the crossings of the main and the auxiliary members in a radial direction of the reinforcing cage, thus assuring the formation of a properly shaped reinforcing cage. The spatial separation between conductors which are connected to the stationary and the rotary electrode, respectively, is reduced to minimize the welding voltage. The conductor connected to the stationary electrode is shaped in a special configuration such that the values of voltage and current supplied to the welds or crossings be uniform as viewed circumferentially of the reinforcing cage, thus assuring a homegeneous welding result.

FIG. 1 illustrates several forms of prestressed concrete piles. By way of example, FIG. 1(a) shows a bottom pile $P_1$ carrying a conical shoe Sh on its free end and a planar end plate Cap on its upper end. FIG. 1(b) shows a middle or a top pile $P_2$ carrying planar end plates Cap on its opposite ends for joined use with the bottom pile $P_1$. Such pile represents a hollow cylindrical concrete body having a length on the order of 7 to 15 meters and a diameter on the order of 300 to 600 milimeters. A reinforcing cage C as shown in FIG. 1(c) is embedded in the annular concrete body. The purpose of the reinforcing cage C is to prevent the occurrence of cracks in the prestressed concrete pile (hereafter referred to as "PC pile") and to improve the rigidity and the bending strength. It includes a plurality of main members 1 in the form of high strength steel bars designed for prestressed concrete use (hereafter referred to as "PC steel bars") having a diameter on the order of 7.4 to 13 milimeters and arranged at a suitable spacing along a circle of a given diameter to define a set 10. To maintain such layout, the cage also includes an auxiliary member 2 in the form of a wire of ordinary iron or soft steel having a diameter from 3.2 to 6 milimeters (JIS 3532), which is wound around the set of main members 1 in a helical configuration, with the crossings of the main members 1 and the auxiliary member 2 being fixedly connected together.

The PC pile P is formed by a process including the steps of disposing the reinforcing cage C in a form or mold while simultaneously tensioning the main members 1, which are the principal structural elements of the set 10, with a tension which is as large as 70% of the tensile strength of the main members 1 (for example, with a tension of 87.5 kg.f/mm² when the main members have a tensile strength of 125 kg.f/mm²), casting fluid concrete into the form, rotating the form about the axis thereof to mold concrete into a hollow cylindrical configuration by utilizing the centrifugal force which results from such rotation, steam curing the assembly to obtain a given strength of the concrete, and releasing the tension applied to the main members 1, thus introducing a prestress into the concrete.

To secure the crossings of the main members 1 and the reinforcing member 2 in forming the reinforcing cage C, the crossings may be connected together by tying with a thin wire, by clamping the both members with clips, or by welding through direct energization of the crossings to produce a resistance heating. Of these techniques, the welding technique through the direct energization is most popular in view of its high productivity.

As mentioned previously, when forming the reinforcing cage C by the welding technique, it is necessary to temper the welds inasmuch as tension of great magnitude is applied to the main members during the time the pile is manufactured and the PC pile P, in which the prestress is applied by embodying the cage C therein, is later driven into earth by a pile driver which applies an impact of great magnitude thereto. The tempering operation is necessary because if the crossings of the main members 1 and the auxiliary member 2 are merely welded without any subsequent treatment, the main members 1 in the region of the welds are hardened to an abnormally high hardness and become brittle as a result of the rapid heating and cooling or quenching during the welding process, and fine cracks may be produced therein as a result of the tension applied to the main bars during the manufacturing of the pile, the impact applied when driving the pile or shocks occurring when the pile is inadvertently dropped during its transportation, which cracks may cause a fracture of the main members 1. Accordingly, it is absolutely necessary that the welds by tempered to restore the inherent strength of the main members 1.

FIGS. 2(a) and 2(b) show a conventional arrangement which is used to weld the crossings of the main members and the auxiliary member and to temper the welds in order to form the reinforcing cage.

FIG. 2 shows a cylindrical stationary electrode 3 of a given diameter, around which a welding rotary electrode and a tempering rotary electrode 4, 5 are disposed in opposing relationship, for example, with an angular spacing of 180° therebetween. The stationary electrode 3 is fixedly mounted on the free end of a cylindrical conductor 31 which is supported in a cantilever fashion by a standard 32 which is electrically insulated. Both the welding and the tempering rotary electrode 4, 5 are mounted on arm members 61 which are attached to the end face of a rotary drum 6 located adjacent to the stationary electrode, the drum 6 having a diameter greater than that of the stationary electrode 3 and disposed in concentric relationship with the conductor 31. As shown, urging members such as coiled compression springs 62 are interposed between the arm members 61 and the electrodes 4, 5. The drum 6 is rotatable at a given speed in a direction indicated by an arrow, by means of a drive unit and a transmission mechanism, both of which are not shown. All of the electrodes 3, 4 and 5 are fed from a welding power source 7, across which the primary side of a welding transformer 71 is connected. The stationary electrode 3 is connected to the secondary side of the transformer through a connecting conductor 72. An annular collector ring 73 is secured to the end face of the drum 6 which is located adjacent to the standard 32, and is engaged by a feeding brush 74 connected to the secondary side of the transformer. A pair of strip conductors 41, 51 are secured to the inner surface of the drum 6 and extend axially therealong and have their one end connected to the collector ring 73 and their other end connected through conductive braids 42, 52 to the rotary electrodes 4, 5, respectively. An annular spool 8 is disposed at a given spacing to the left, as viewed in FIG. 2(a), of the stationary electrode 3, and has a pair of end flanges 81, between which a number of turns of the auxiliary member 2 is received. A drive roll 82 is driven for rotation by a drive unit, not shown, and the resulting rotation is transmitted to one of flanges 81 of the spool, whereby the latter is rotatable in the rewind direction of the auxiliary member 2 which is in the same direction as the direction of rotation of the drum 6. A plurality of guide rolls 83 are disposed along a path of movement of the auxiliary member 2 from the spool 8 to the vicinity of the stationary electrode 3, and are carried by a support arm, not shown, which is fixedly mounted on the drum 6. In this manner, the auxiliary member 2 is paid off the spool 8 to be supplied to a point around the periphery of the stationary electrode 3.

The plurality of main members 1 are inserted into the annular space defined by the outer periphery of the conductor 31 and the inner periphery of the drum 6, from right as viewed in FIG. 2(a). These main members have buttonheads 11 shown in FIG. 1(c) which are retained in position by a locking member 9. In this manner, the main members 1 extend axially in parallel relationship with each other on a circle disposed around the stationary electrode 3 with a given spacing therebetween. By moving the locking member 9 to the left, as viewed in FIG. 2(a), at a given rate, the main members simultaneously move over the stationary electrode 3. Under this condition, the spool 8 may be rotated at a given rate to pay off the auxiliary member 2, which is then supplied to a point around the set 10, thus allowing the auxiliary member 2 to be wound helically around the set 10. At the same time, the rotary drum 6 is driven for rotation in the given direction and the welding power supply turned on, whereby the crossing of the main member 1 and the auxiliary member 2 is pressed by the welding electrode 4, which urges the crossing toward the stationary electrode 3 under the force of the member 62, as shown in FIG. 2(b). The welding current is passed for a given cycle under this condition, producing a resistance heating of the crossing, which is therefore welded together. After the drum 6 has rotated through 180° in the direction of the arrow, the same crossing which is welded is pressed by the tempering electrode 5, which urges the crossing toward the stationary electrode 3 under the resilience of the member 62. The tempering current is passed for a given cycle under this condition, thus producing a resistance heating effect of the crossing to achieve a tempering of the crossing. The cyclical application of the welding current and the tempering current is achieved by providing a proximity switch which produces an output whenever the welding rotary electrode 4 has rotated through a predetermined angle which depends on the number of main members. In response to an output from the proximity switch, the application of either current is initiated and continues over a given time interval, by applying a voltage across the stationary electrode 3 and either rotary electrode 4 or 5.

As the set 10 continues to move to the left, the auxiliary member 2 is sequentially wound around the set, with the crossings of the main members 1 and the auxiliary member 2 being successively welded and tempered, thus forming the reinforcing cage C as shown in FIG. 1(c).

FIG. 3(a) shows a cross section of the main member 1 in the region of the welded crossing. Assuming that an ideal welding operation and tempering operation have taken place in the crossing of the main member 1 and the auxiliary member 2, the resulting hardness will be as shown graphically in FIG. 3(b). Specifically, FIG. 3(b) shows measured values of the hardness taken along a line A—A in a region 1a of the cross section of the main member 1 which is affected by the welding process. As shown, the hardness rapidly decreases from a hardness level Th in the surface layer which is abnormally high, for example, MHV610 as compared with the usual hardness level $T_0$ which may be micro-Vickers hardness MHV480, to a hardness level Tλ of MHV350, for example, which is abnormally low as compared with the hardness level $T_0$ followed by returning to the hardness level $T_0$ when proceeding from the surface to the center of the main member 1. However, after the tempering operation which follows the initial welding operation, the characteristic hardness curve will be as shown in FIG. 3(c) in which the hardness level Th in the surface layer of the main bar 1 as shown in FIG. 3(b) disappears.

In the conventional arrangement mentioned above, all of the crossings of the main members 1 and the auxiliary member 2 have been cyclically energized to pass the welding current and the tempering current in a "mechanical" manner. As a result, if the electrode which is utilized to pass the welding current through the crossings experiences a poor contact which prevents the flow of a necessary and sufficient welding current to thereby cause an incomplete weld or if a foreign matter or matters are present between the electrode and the crossings resulting in a failure of the welding operation, the "mechanical" process results in passing the tempering current through the same crossings when the tempering rotary electrode has rotated through 180°. Consequently, these crossings are welded to a further degree or welded for the first time rather than achieving a tempering operation, defeating the very purpose intended. The ultimate result is a high likelihood that a reinforcing cage may be manufactured having main members in which local regions Th of high hardness are present.

Considering now the tempering operation, if the magnitude of a tempering current in excessively high, the crossings will be heated to an abnormally high temperature, and are then rapidly cooled from such temperature, resulting in increasing the hardness to a greater value than that attained during a welding operation. Conversely, if the magnitude of a tempering current is excessively low, the crossings will be only heated to a temperature which is insufficient to achieve a desired tempering effect. It is therefore seen that a proper magnitude of tempering current must be chosen in relation to the magnitude of the welding current. In the prior art practice, a value of tempering current has been determined based upon experiences each time the specification of the main members is changed. However, it is difficult to assure a proper tempering operation, disadvantageously causing a difficulty in achieving a uniform quality or causing a reduction in the production efficiency.

In the prior art arrangement, when winding the auxiliary member 2 around the set of main members 10, both the rotary drum 6 and the spool 8 are driven for rotation in a direction to rewind the auxiliary member 2 from the latter at a rate which is predetermined to prevent the auxiliary member 2 from drooping. However, since the spool 8 has a moment of inertia $GD^2$ which is substantially higher than the moment of inertia of the rotary drum 6 because of the number of turns of the auxiliary member 2 disposed thereon, an increase in the speed of rotation of the spool 8 is significantly lagging with respect to the rotation of the rotary drum 6 which can be immediately increased to a given value upon starting, thus making it difficult to achieve a synchronization between the both speeds when starting. Consequently, a delay is involved in paying off the auxiliary member 2 to prevent the auxiliary member 2 from being wound around the set of main members 10 in a regular helical form. This results in a distortion in the configuration of the reinforcing cage C manufactured, and when the set of main members 10 is tensioned, the auxiliary member 2 may become separated in the region of the welds to cause damage to the main members 1, giving rise to the likelihood that a fracture thereof may be caused.

A distortion of the reinforcing cage C manufactured with a conventional arrangement is also caused by other factors. Specifically, when the welding rotary electrode 4, which is mounted through the force of the member 62 on the arm member 61 which is fixedly mounted on the rotary drum 6, welds the crossing of the main member 1 and the auxiliary member 2, even if a suitable force is applied by the rotary electrode 4, the main member 1 is subject to a torsional stress in the direction of rotation of the rotary electrode 4 which rotates as the rotary drum 6 rotates in a direction by the arrow shown in FIG. 2(a). Hence, if the force with which the rotary electrode 4 is urged has a great magnitude, the rotary electrode 4 will be urged by the force of the member 62 to move closer to the periphery of the stationary electrode 3 during its movement from one of the main members to another, and when it reaches the next main bar 1, it may press against the main member 1, with the auxiliary member 2 interposed therebetween, with an angle of inclination shown in FIG. 4, causing the main member 1 to be displaced in the direction of rotation. This may also cause a distortion of the reinforcing cage C.

If the welding electrode 4 or the tempering electrode 5 contacts the crossing at an angle, the auxiliary member 2 will not follow a circular helical path, but will depict a helix which is polygonal in section corresponding to the number of the main members 1. Thus, the active surface of both electrodes 4, 5 will also depict a locus which has corners, and an intensive sparking may occur to damage the main members 1 during the welding or the tempering operation, rendering the control of the welding operation difficult.

Considering the conductor 31 associated with the stationary electrode 3 and the conductors 41, 51 associated with the welding and tempering electrodes 4, 5 used in the conventional arrangement, it will be appreciated that a flexible use of the arrangement is permitted by choosing an outer diameter of the conductor 31 which is less than the outer diameter of the stationary electrode 3 and choosing an increased inner diameter of the rotary drum 6 while providing stationary electrodes 3 of various diameters so that reinforcing cages having several different diameters may be produced by changing the particular stationary electrode 3 used. Under these circumstances, the separation G between the conductor 31 on the stationary electrode 3 and the conductors 41, 51 associated with the rotary electrodes 4, 5 has an increased value to increase the impedance across the stationary electrode 3 and the rotary electrodes 4, 5. This requires a higher output voltage from the welding transformer 71. This in turn increases the likelihood of occurrence of sparking when welding the crossings of the main members 1 and the auxiliary member 2. In addition, the path length from the stationary feeder brush 74 to the interconnecting conductor 72 through which both the welding and the tempering current must flow changes as the drum 6 rotates, thereby changing the circuit inductance and hence the magnitude of the welding and the tempering current, as viewed in the circumferential direction of the reinforcing cage. This results in a variation in the quality of the welding and the tempering operation, presenting another difficulty in the quality control.

OBJECTS OF THE INVENTION

It is a first object of the invention to provide a method of and an apparatus for forming a reinforcing cage for PC pile including a plurality of PC steel bars which serve as a set of main members to which a prestress is applied and also including an auxiliary member which is helically wound around the set and secured thereto by a welding operation to thereby form a reinforcing cage and wherein any degradation in the mechanical properties of the main members in the region of the welds is avoided.

It is a second object of the invention to provide a method of forming a reinforcing cage for PC pile in which the magnitude of a welding current and a tempering current is chosen in an interrelated manner so that any degradation in the mechanical properties of the main members is avoided in the region of the welds.

It is a third object of the invention to provide a method of and an apparatus for forming a reinforcing cage for PC pile in which the occurrence of a twisting stress in the main members or a twisting of the reinforcing cage, which may cause a fracture of the main members, is avoided while stressing the set of main members or after the prestress has been introduced into the concrete, thereby assuring the provision of a reinforcing cage of a proper configuration for PC pile.

It is a fourth object of the invention to provide an apparatus for forming a reinforcing cage for PC pile in which a uniform quality of all the welds is assured.

It is a fifth object of the invention to provide a method of and an apparatus for forming a reinforcing cage used as a structural element of PC pile in which the first to the fourth objects are entirely combined to provide a reinforcing cage having an excellent tensile strength, whereby PC pile may have high impact and bending strength and other necessary properties.

Above and other objects, features and advantages of the present invention will be better understood from the following detailed description made in conjunction with the attached drawings.

BRIEF DESCRIPTION OF THE DRAWINGS

FIGS. 1(a) and (b) are perspective views of PC piles in which the reinforcing cage of the invention is embedded as a structural element thereof;

FIG. 2(b) is a schematic illustration of an arrangement which is utilized to weld a crossing between the main member and the auxiliary member when forming a reinforcing cage;

FIG. 6(b) is a series of timing charts, illustrating various signals appearing in the apparatus of FIG. 6(a);

DESCRIPTION OF EMBODIMENTS

The fundamental principle of the invention will be described first. The purpose of forming a reinforcing cage by winding an auxiliary member around a set of main members with the auxiliary member being welded with main members at the crossings therewith, followed by a tempering operation, is to maintain the set of main members at the desired locations when molding a PC pile under the influence of a centrifugal force. (In Japan, the auxiliary member in the form of soft steel wire of a reduced diameter has no purpose of increasing the rigidity of the pile.)

This purpose is subsidiary to the main objective of introducing a prestress into the pile by utilizing the high tension maintained in the main members, which represent the main structure elements of the reinforcing cage. If a majority of crossings in the entire reinforcing cage 10 is positively and properly secured in place even though a minority of crossings are not properly secured, the centrifugal force applied during the molding of the pile does not disturb the location of the main members in the set. Therefore, rather than passing the welding current and the tempering current in a simple, "mechanical" manner through all the crossings as in the prior art to produce defective welds with a high probability of occurrence and thereby form hardened and brittle spots in the main members in the region of such defective welds which defeat the achievement of the main objective, the fundamental principle of the invention then is to form a reinforcing cage on the basis of three criteria given below.

(1) A crossing which may yield a defective weld is left without a welding operation;

(2) Only those crossings which have been positively welded are subject to a tempering operation while avoiding the application of the tempering current to other crossings which have been left without a welding operation; and (3) A proper welding operation and a proper tempering operation are applied to those crossings which can be welded in a positive manner.

In a first embodiment of the invention which is designed to implement the paragraph (1) described above, there is provided a method of and an apparatus for controlling the application of a welding current which is characterized, in performing a welding operation by passing a welding current through a crossing of a main member and an auxiliary member while urging such crossing toward a stationary electrode by means of a welding rotary electrode, by choosing a given time interval immediately after the initiation of an energization cycle as an energization confirming interval, detecting the presence or absence of a welding current during the confirming interval, allowing the energization cycle to be continued if the welding current is detected, and if the welding current is not detected, interrupting the remainder of the energization cycle based on the determination that an incomplete weld may be formed in the crossing of the main member and the auxiliary member.

Figure 5:
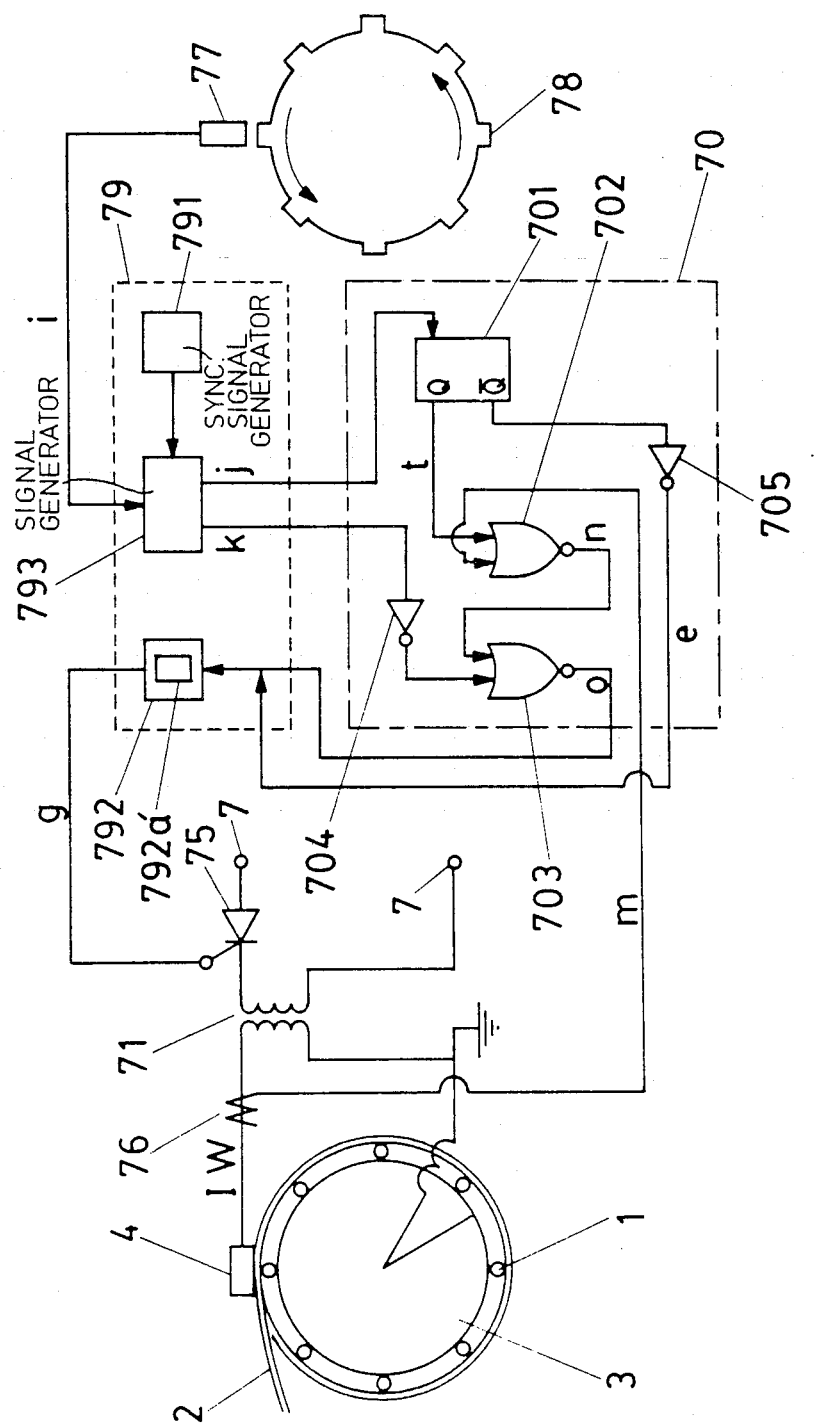
FIG. 5(a) is a block diagram of a first embodiment of the invention.
FIG. 5(b) is a series of timing charts illustrating various signals appearing in the arrangement of FIG. 5(a)
FIG. 5(c) is a circuit diagram of a portion of the apparatus shown in FIG. 5(a)
FIG. 5(d) graphically shows certain waveforms appearing in the apparatus of FIG. 5(a)
Figure 5B:
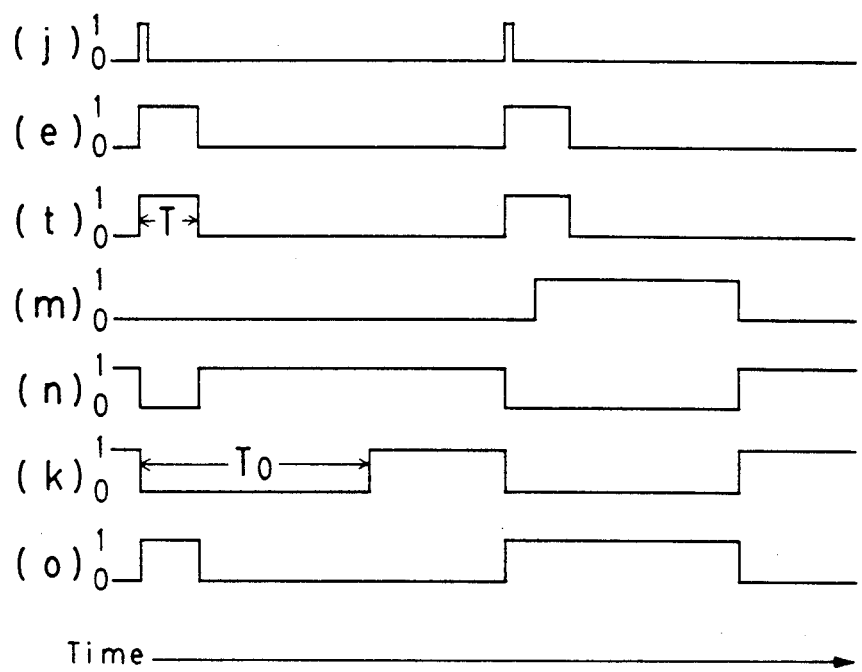
Figure 5:
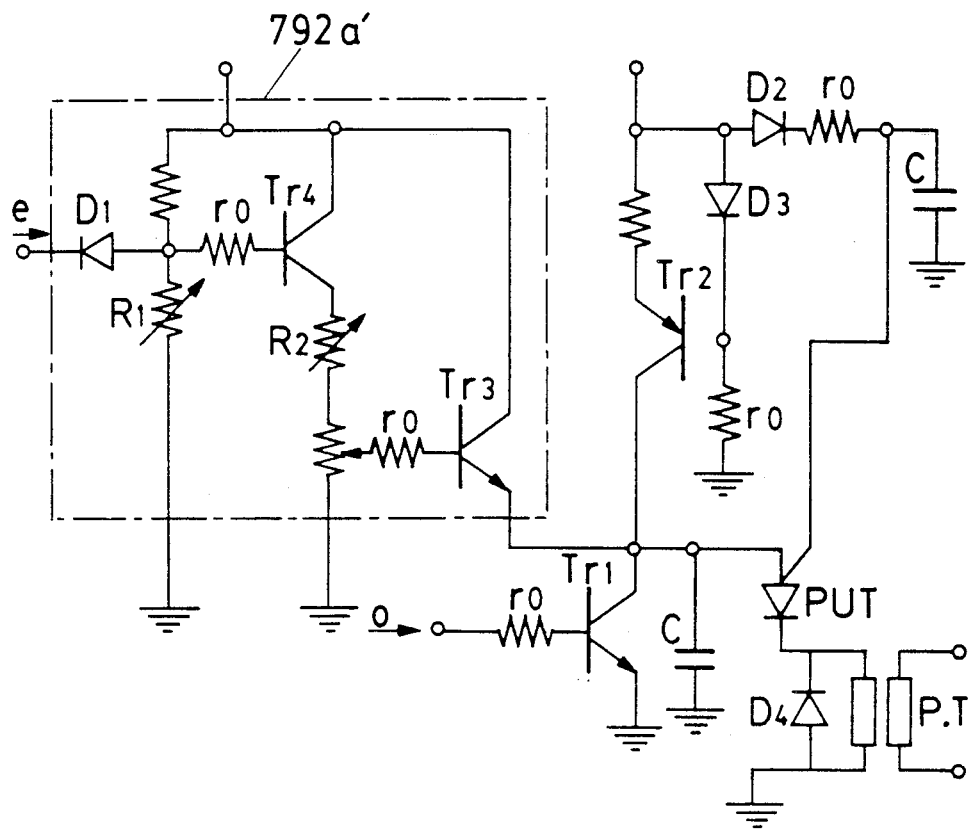
Figure 5:
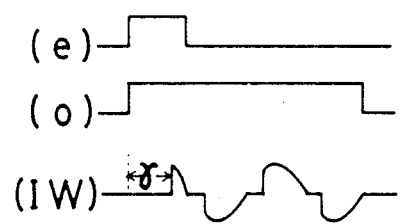

The first embodiment will now be described below with reference to FIGS. 5(a) to (d). Referring to FIG. 5(a), a welding power supply is connected across a pair of terminals 7, across which the primary side of a welding transformer 71 is connected in series with a thyristor 75. A current detector 76 is coupled with the secondary side of the transformer and may comprise a current transformer, for example, for detecting the welding current. An electrode position detector 77 may comprise a proximity switch, for example. The detector 77 is disposed in opposing relationship with a dog 78 which is mounted on a rotary drum, not shown, which supports the welding rotary electrode 4, thus producing an output signal i each time the rotary electrode 4 rotates through a given angle, determined in accordance with the number of the main members, to reach a next welding position. A synchronous starter 79 includes a sync signal generator 791, a firing circuit 792 and a signal generator 793. The sync signal generator 791 produces a sync signal which is utilized in a control systen. The firing circuit 792 produces a gate signal g which is applied to the thyristor 75. The signal generator 793 responds to the output signal i from the generator 791 by outputting an energization initiation timing signal j and an energization interval signal ("0" level) k, both of which are shown in FIG. 5(b). The signal k which determines the energization interval is a periodic signal having an energization duration of $T_0$ and defining an energization cycle. By way of example, where the energization takes place over two cycles of a commercial line frequency, the signal k may have a corresponding time width. A firing control 70 includes a one-shot multivibrator 701 and NOR elements 702, 703. In response to the energization initiation timing signal j supplied to its input, the one-shot multivibrator 701 provides at its Q output terminal a signal t of "1" level and having a duration $T < T_0$, which establishes a time interval T during which the energization is to be confirmed. If the energization takes place over two cycles as in the example mentioned above, the duration T may be equal to the duration of one-half cycle (0.008 to 0.009 second), for example. NOR element 702 receives the signal t as well as a welding current detection signal m which represents an output from the current detector 76. If either input signal is present, it feeds an output n of "0" level to NOR element 703, which also receives the signal k, as inverted by NOT element 704. During the time when the both input signals are input, NOR element 703 delivers a firing control signal 0 of "1" level to the firing circuit 792. The $\overline{Q}$ output from the one shot multivibrator 701 is passed through NOT element 705 for inversion, to provide a firing time adjusting signal e, which is supplied to a firing angle control circuit 792a' as shown in FIG. 5(c). Referring to FIG. 5(c), the control circuit includes transistors Tr1 to Tr4, programmable unijunction transistor PUT, diodes $D_1$ to $D_4$, variable resistors $R_1$, $R_2$, fixed resistor rO, capacitor C and pulse transformer P.T.

The operation will now be described with reference to several timing charts shown in FIG. 5(b). It is assumed that the variable resistor $R_1$ in the firing angle control circuit 792a' is adjusted to present a resistance of zero.

When the rotary electrode 4 reaches a location where a welding operation is to take place, the electrode position detector 77 provides an output, which causes the synchronous starter 79 to produce the energization initiation timing signal j and the signal k which establishes the energization interval. In response to the timing signal j, the one shot multivibrator 701 begins to output the signal t of the duration T which establishes the time interval during which the energization is to be confirmed and which is fed to NOR element 702. Thus, NOR element 703 receives the output n of "0" level from the element 702 as well as the inverted signal k, thereby delivering the firing control signal 0 to the firing circuit 792. This activates the firing circuit 792 in a manner such that the gating signal g is supplied therefrom for application to the thyristor 75, allowing the energization cycle to be initiated. After the initiation of the energization cycle, if it is determined that a welding current IW flows during the time the one shot multivibrator 701 maintains its output or during the time interval T during which the energization is to be confirmed, the welding current IW continues to flow after the time interval T has passed since the circuit path across the stationary electrode 3 and the rotary electrode 4 is short-circuited through the main members 1 and the auxiliary member 2. Accordingly, the welding current detection signal m continues to be fed to NOR element 702 even after the signal t has disappeared, allowing NOR element 703 to output the firing control signal 0 until the signal k disappears. Accordingly, the firing current 792 continues to be activated until the end of the energization cycle, and the welding current IW flows throughout the energization interval $T_0$', assuring a positive welding of the crossing.

In the event there is a likelihood that the welding effect may be insufficient, namely, if the detection signal m fails to be produced by the welding current detector 76 after the initiation of the energization cycle even though the time interval T during which the energization is to be confirmed has passed, the signal t terminates at the end of the time interval T, whereby NOR element 702 is no longer fed. Thus, the firing control signal 0 from the output of NOR element 703 is terminated, deactivating the firing circuit 792. It will thus be seen that any crossing between the main member and the auxiliary member is either perfectly welded together or in no way welded. This prevents the occurrence of a poor weld.

In the above description, it has been assumed that the variable resistor $R_1$ of the firing angle control circuit 792a' presents a resistance of zero, and hence the firing angle of the thyristor 75 is controlled in accordance with the resistance of the variable resistor $R_2$. However, by changing the resistance of the variable resistor $R_1$, it is possible to control the impedance of the transistor $Tr_4$ during the time the firing time adjusting signal e is applied to the base of this transistor. Thus, the firing angle $\gamma$ of the thyristor 75 during the confirmation time interval T can be controlled in a manner illustrated in FIG. 5(d), by adjusting the resistance of the variable resistor $R_1$. This allows the presence or absence of current flow across the main members and the auxiliary members to be confirmed while preventing a voltage breakdown, by adjusting the firing angle during the initial half cycle of the energization cycle in a manner indicated in FIG. 5(d) where deposition of dirt is present between these members. Alternativaly, the current flow can be established by causing a breakdown under a high voltage, depending on the adjustment of the firing angle.

In another or a second embodiment of the invention which implements the paragraph (2) initially mentioned, there is provided a method of and an apparatus for controlling the welding and the tempering current which eliminates the occurrence of an unintended result such that a reinforcing cage may be formed in which the crossings are only subject to a welding operation as a result of passing the tempering current through those crossings which have not been properly welded. In this embodiment, during the energization cycle associated with the welding operation applied to the crossings of the main members and the auxiliary member, a time interval is established during which the energization is to be confirmed, thus allowing subsequent energization to be prevented if a flow of the welding current is not detected during such time interval. In addition, the presence or absence of the welding current is written into a shift register for each energization cycle at a selected digit position so that during the tempering cycle, the tempering operation is allowed to take place only if the digit output from the shift register indicates "the presence of the welding current". In this manner, it is assured that the tempering current is properly passed through those crossings which have previously been positively welded together.

Figure 6A:
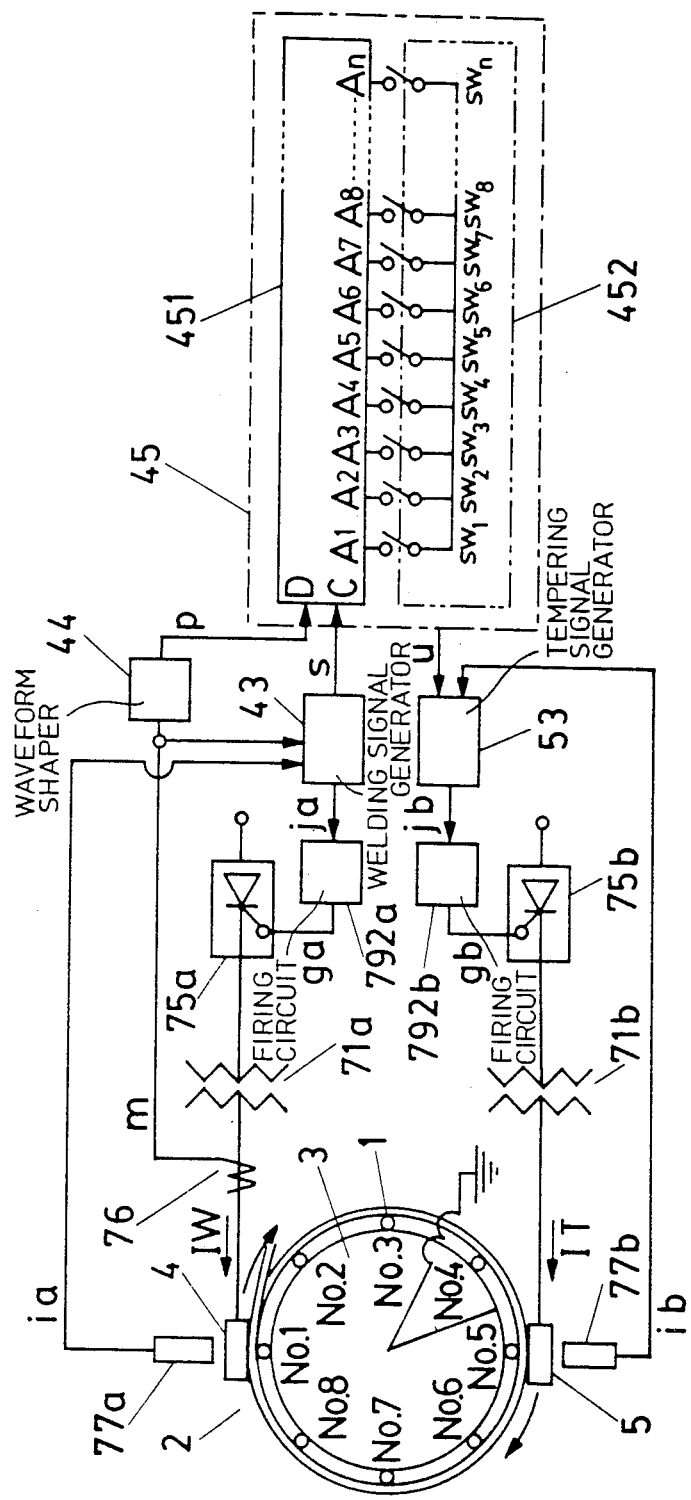
FIG. 6(a) is a block diagram of a second embodiment of the invention.

An example of the second embodiment will now be described with reference to FIGS. 6(a) and (b). In FIG. 6(a), there are shown a pair of transformers 71a, 71b having their primary side connected to a power supply, not shown, through respective thyristor switches 75a, 75b which are in turn controlled by firing circuits 792a, 792b, respectively. A welding current detector 76 is connected with a secondary side of the transformer 71a in the circuit with the rotary electrode 4. A pair of welding and tempering electrode position detectors 77a, 77b are associated with the welding and the tempering rotary electrode 4 and 5, respectively, to detect that the associated electrode has reached a predetermined welding or tempering location, whereupon they produce an initiation timing signal ia for the welding cycle and an initiation timing signal ib for the tempering cycle. A plurality of main members disposed around the stationary electrode 3 are indicated by No. 1, No. 2, No. 3, ... No. n, which represent the address of the respective main members. It is to be understood that the predetermined welding or tempering position corresponds to such address. As before, the welding electrode 4 and the tempering electrode 5 are disposed opposite to each other diametrically of the stationary electrode 3.

A welding signal generator 43 comprises the sync signal generator 791, signal generator 793 and the firing control 70 shown in FIG. 5(a) and mentioned above in connection with the first embodiment. As before, the welding signal generator 43 responds to an output ia from the welding electrode position detector 77a by delivering to the firing control 70 an energization interval signal k and an energization initiation timing signal ja, which are timed by a sync signal produced by the sync signal generator 791. The firing control 70 outputs a welding energization initiation timing signal ja to the firing circuit 792a, the output of which controls the thyristor 75a to initiate the flow of the welding current IW. If the detector 76 detects the flow of the welding current IW during the time interval set for the confirmation thereof after the initiation of the energization to produce a welding current detection signal m, the firing circuit 792a continues to be activated throughout the given energization interval $T_0$ to supply the welding current IW. On the contrary, if the detector 76 fails to detect the welding current IW during the confirmation time interval T, the absence of the detection signal m deactivates the firing circuit 792a, thus interrupting the flow of the welding current IW.

In addition to the arrangement used in the first embodiment, the arrangement of the second embodiment also includes a tempering address assigning circuit 45, which comprises a shift register 451 which receives an output p from a waveform shaper 44 which receives a detection signal m from the detector 76, and a tempering reference address circuit 452. It will be noted that the shift register 451 receives, in addition to the output p, a shift signal s which is synchronized with a falling edge of the signal t establishing the time interval during which the energization is to be confirmed and which is outputted by the multivibrator 701 of FIG. 5(a) which is included in the welding signal generator 43. The shift register 451 includes a plurality of digit output terminals $A_1$, $A_2$, $A_3$, ... An, which are equal in number of addresses No. 1 to No. n. These output terminals are connected to corresponding switches SW1, SW2, SW3, ... SWn of the tempering reference address circuit 452. When the number of main members used in the reinforcing cage is determined, the tempering reference address circuit 452 is externally operated so that those switches corresponding to the address of the main members to which the tempering operation is to be applied are selectively closed.

A tempering signal generator 53 receives a tempering initiation signal u which is outputted by the tempering reference address circuit 452 and the energization initiation timing signal ib which is supplied from the output of the tempering electrode position detector 77b and indicative of the position of the tempering rotary electrode 5, and produces a tempering command signal jb applied to the firing circuit 792b and which is synchronized with the tempering energization initiation timing signal ib only if the both signals u and ib are concurrently supplied thereto. When activated by the command signal jb, the firing circuit 792b applies a gating signal gb to the thyristor switch 75b, thus supplying the tempering surrent IT to the tempering rotary electrode 5 for a given cycle.

The operation of the tempering address assigning circuit 45 which is fed with the shift signal s from the welding signal generator 4 and the output p from the waveform shaper 44 will be described below with reference to the timing charts shown in FIG. 6(b) and FIG. 5(a) as well as the synchronous starter 79 and the firing control 70 which have been mentioned above in connection with the first embodiment.

When the welding current IW flows through the crossing, the output m from the welding current detector 76 is shaped to provide "P" data signal, which is applied to the shift register 451 upon occurrence of the shift signal s, thus indicating the fact that the auxiliary member 2 has been welded to the main member 1 located at the address No. 1 at the crossing therebetween. In other words, "welding current IW present" is entered, whereby an output of "1" level appears at the digit output $A_1$ of the shift register 451. In the absence of the welding current IW, "welding current IW absent" is entered, whereby the digit output A1 assumes "0" level. In a similar manner, as the welding rotary electrode 4 sequentially reaches the welding points corresponding to the addresses No. 2, No. 3, No. 4 and so on of the main members, the welding energization cycle is initiated, and the presence or absence of the welding between the auxiliary member 2 and the main members located at the addresses No. 2 No. 3, No. 4 and so on is entered into the shift register 451. The data entered (namely, the presence or absence of the welded fact) sequentially shifts through the shift register 451 in a direction from the digit $A_1$ to An in response to each shift signal s applied thereto. Consequently, as the welding rotary electrode 4 moves past the welding position corresponding to the main member located at the address No. 3, data concerning the main members 1 located at the addresses No. 3, No. 2 and No. 1 appear at each digit output terminal $A_1$, $A_2$, $A_3$, respectively.

For the convenience of description, it is assumed that the number of main members is eight, as shown. In this instance, the tempering operation is initiated at the address of No. 1. Accordingly, the switch SW4 in the tempering reference address circuit 452 is selectively closed by an external operation. Thus, the tempering reference address circuit 452 provides no output until the welding rotary electrode 4 reaches the welding location corresponding to the address No. 4. However, before the welding electrode 4 reaches such welding location, the shift signal s applied to the shift register 451 causes data concerning the main members 1 located at the addresses No. 1, No. 2 and No. 3 to be entered at the digits $A_4$, $A_3$ and $A_2$, respectively. The presence or absence of welded fact concerning the main member 1 located at the address No. 4 is written into the digit or output terminal $A_1$ anew. If the auxiliary member 2 has been welded to the main member 1 located at the address No. 1 at the crossing therebetween, an output of "1" level appears at the digit output $A_4$, and is fed through the closed switch SW4 to provide the tempering initiation signal u to the tempering signal generator 53. On the other hand, when the welding rotary electrode 4 has moved past the welding location corresponding to the address No. 4 and now reaches the welding location corresponding to the address No. 5 of the main member, the tempering rotary electrode 5 then reaches the tempering location corresponding to the address No. 1 of the main member, so that the electrode position detector 77b provides an output, thus supplying the energization initiation timing signal ib for the tempering operation to the tempering signal generator 53. When the both signals u and ib are supplied to the tempering signal generator 53, the latter produces the tempering command signal jb. The tempering command signal jb activates the firing circuit 792b, whereby a gating signal gb is applied to the thyristor switch 75b to initiate the energization cycle for the tempering operation. Accordingly, the tempering current IT flows through the crossing between the auxiliary member 2 and the main member 1 located at the address No. 1 for a given time interval. If the crossing between this main member 1 and the auxiliary member 2 has not preciously been welded, there exists "0" level at the output terminal $A_4$ of the shift register 451, so that there can be produced no tempering initiation signal u from the tempering reference address circuit 452. Accordingly, no tempering command signal jb can be produced if the energization initiation timing signal ib is supplied to the tempering signal generator 53.

When the tempering electrode position detector 77b produces an output which corresponds to the address No. 1 of the main member, the welding electrode position detector 77a also produces an output simultaneously which indicates that the welding electrode 4 has reached the welding location corresponding to the address No. 5, thus feeding the shift signal s to the shift register 451. Accordingly, the data entered into the shift register 451 shifts therethrough, whereby data concerning the main member 1 located at the address No. 2 appears at the output terminal $A_4$. If this data represents "welding current IW present", the tempering energization cycle is initiated by the tempering electrode 5 with respect to the main member 1 which is located at the address No. 2 when the welding electrode 4 reaches the welding location which corresponds to the address No. 6. In a similar manner, as the welding electrode 4 advances through the following welding locations, the data indicating the presence or absence of the welded fact concerning the main members located at the addresses No. 3, No. 4, ... No. 8 and No. 1 and No. 2 ... shifts through the shift register, and the tempering energization cycle is initiated by the tempering electrode 5 only if the main member 1 in question has been welded with the auxiliary member 2, as determined on the basis of such data.

It will be seen from the foregoing that the crossings of the main members and the auxiliary member are either perfectly welded or welded in no way. The crossings which have been firmly welded are subject to a tempering operation while the crossings which have not been welded are left without applying a tempering operation thereto. In this manner, there can be formed a reinforcing cage which is entirely free from any poorly welded crossings which may degrade the mechanical properties of the main members.

In a third embodiment of the invention which implements the paragraph (3) initially mentioned, there is provided a method of controlling the welding and the tempering current so that the welding and the tempering current IW and IT of proper magnitudes are applied to the crossings of the main members and the auxiliary member. Specifically, for normally used main members and auxiliary member which have diameters in a range from 7.4 to 13 mm$\phi$ and in a range 3.2 to 6 mm, respectively, their values are chosen to satisfy the following equality:

IT=IW+(0 to 500) amperes

As mentioned previously, the welded crossings of the main members and the auxiliary member have been tempered in the prior art practice. However, the magnitude of the tempering current IT which is passed through the welded crossing has been determined by inference on the basis of experiences, and this failed to assure a proper tempering result. Accordingly, variations occur in the mechanical properties of the main members in the region of the crossings, disadvantageously resulting in a failure to assure uniform quality of the reinforcing cages. To solve this problem, we have obtained an interrelation between a proper magnitude of welding current IW and a proper magnitude of tempering current through experiments, which are illustrated below by way of an example.

EXAMPLE (1) Hardness determination of the main members in a region of welded crossings
  (1) Materials used:
  Main members: PC steel bars of 7.4 mm$\phi$ heat treated by high frequency induction heating
  Auxiliary member: Soft steel wires of 3.2 mm$\phi$
  (2) Preparation of samples
  An increased number of reinforcing cages have been fabricated utilizing different combinations of various values of welding current IW and tempering current IT as given below. In each reinforcing cage, a test point has been chosen from the welds by random sampling. The helical auxiliary member has been removed from the weld which has been chosen as the test point, and a sample has been cut from the main member in the region of the test point.

The magnitudes of the welding current IW and the tempering current IT in respective regions as indicated below have been combined:

|  | welding current IW (amperes) | tempering current IT (amperes) |
|---|---|---|
| upper limit | 2900 ← | → 3300 |
|  | ← | → |
|  | ← | → |
| lower limit | 2000 ← | → 2000 |

Figure 1C:
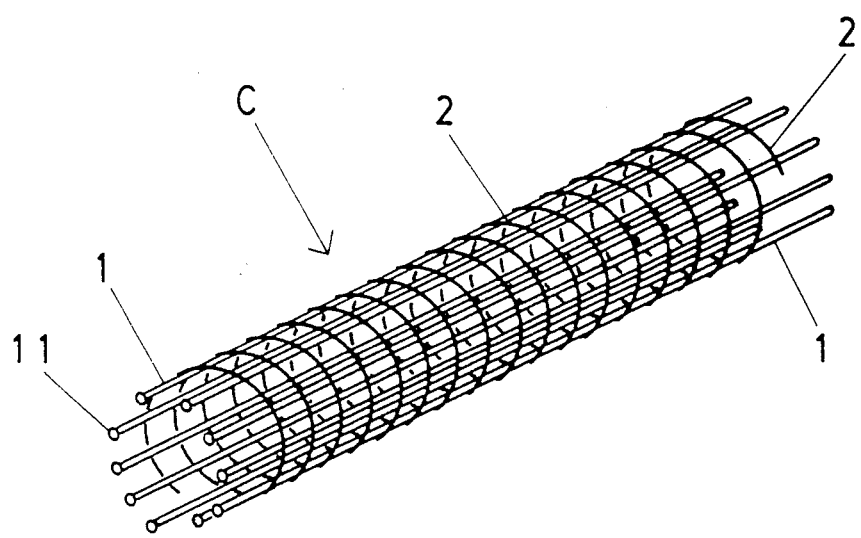
FIG. 1(c) is a perspective view of a reinforcing cage for PC pile formed in accordance with the method and the apparatus of the invention and which may be embedded in the PC piles shown in FIGS. 1(a) and (b)
Figure 2A:
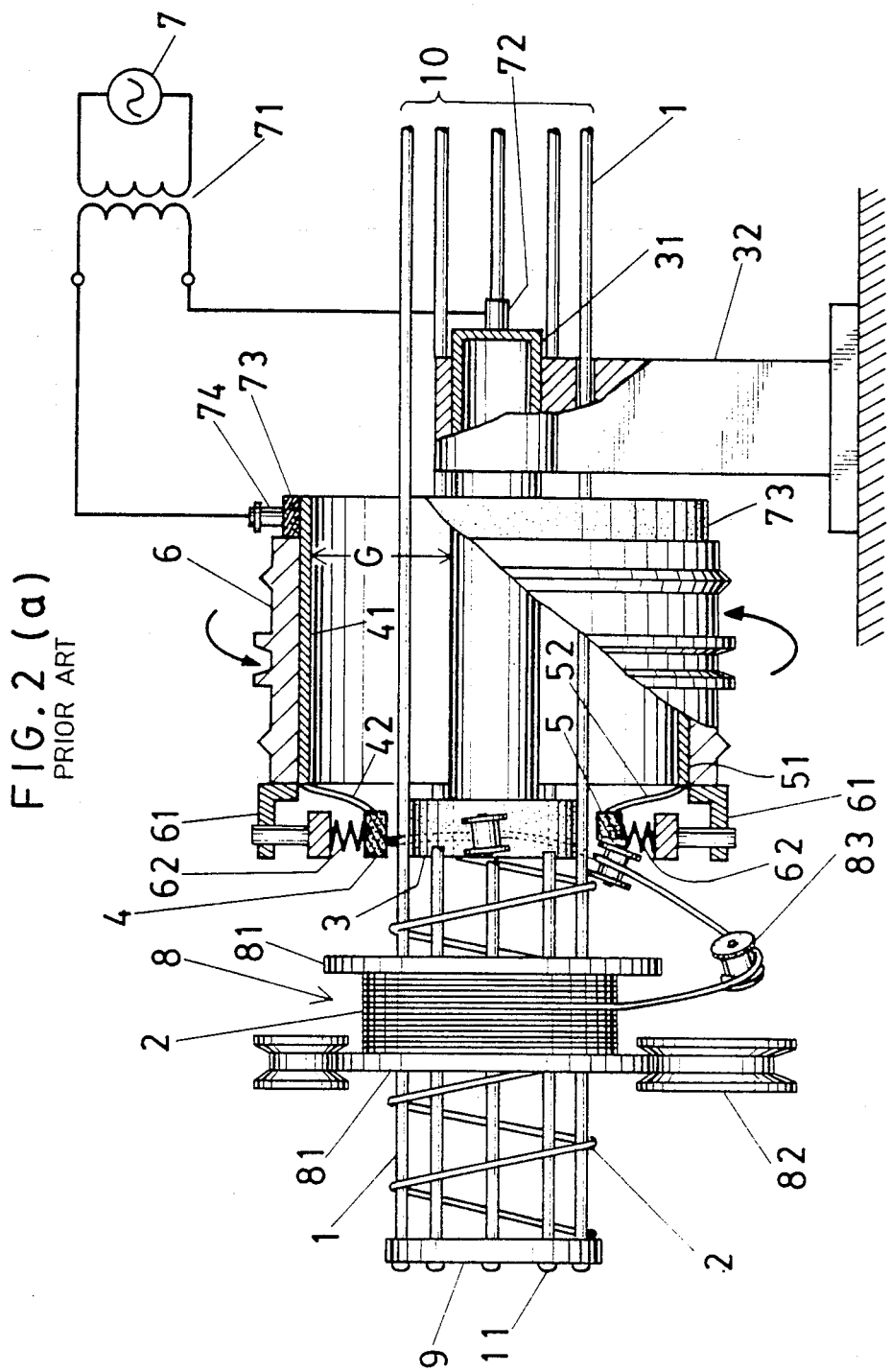
FIG. 2(a) is a front view, partly in section, of a conventional apparatus for forming a reinforcing cage.
Figure 3:
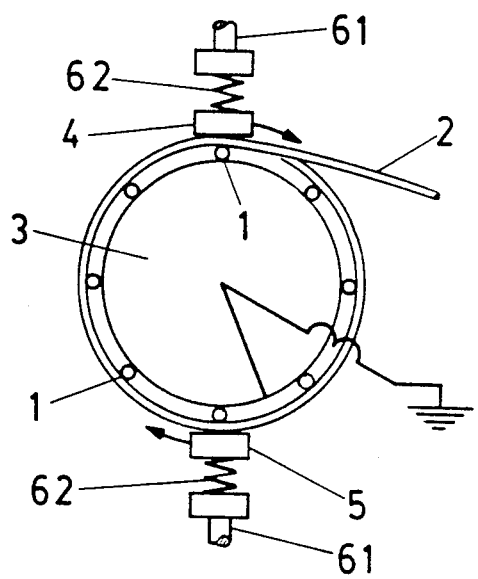
FIG. 3(a) is a schematic cross section of a main member in the region of a weld.
FIGS. 3(b) and (c) graphically show the distribution of hardness taken along the line A—A shown in FIG. 3(a) when the crossing between the main member and the auxiliary member is only subject to a positive welding operation and when the welding operation is followed by a proper tempering operation.
Figure 3:
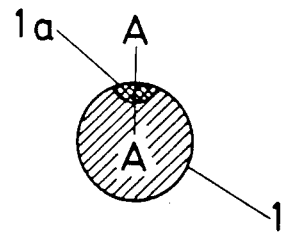
Figure 3:
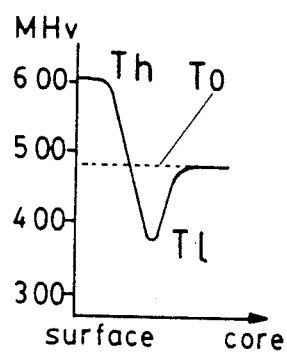
Figure 4:
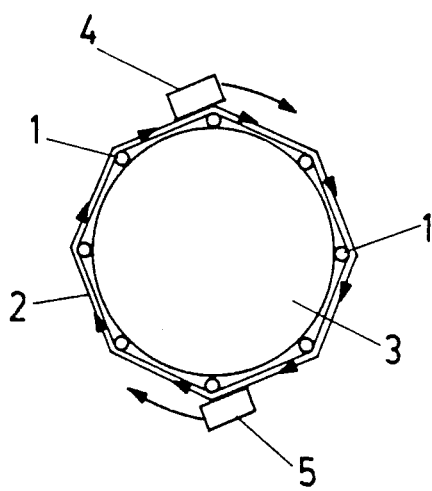
FIG. 4 schematically illustrates the locus depicted by the rotaty electrode, illustrating one of the drawbacks of a conventional arrangement used for forming a reinforcing cage.
Figure 3:
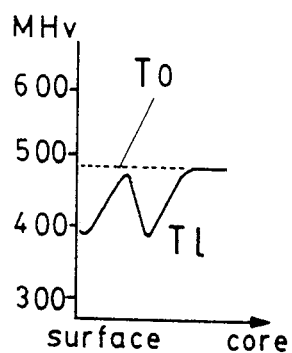

(3) Testing procedure
Each sample has been cut through the center of the weld thereof in a direction perpendicular to the axis thereof, as indicated in FIG. 3(a). The cross section of the weld has been subject to the determination of hardness by utilizing Micro-Vicker's hardness meter, in a direction from the surface toward the center.

(4) Results of test
FIGS. 7(A) to (E) show characteristic curves which graphically represent the distribution of the hardness of each sample, with the distance, in terms of millimeters, from the surface toward the center taken on the abscissa and the measured value of hardness (MHV) on the ordinate. In this Figures, the dotted lines represent the inherent hardness level of the main members.

(2) Determination if the magnitude of the tempering current IT is proper with respect to the magnitude of welding current IW
  (1) Criteria for determination
  Whether or not the welds are properly tempered is determined by comparison against models of hardness curves shown in FIGS. 8(a) to (e) which indicate the tempering conditions given below.

Figure 8A:
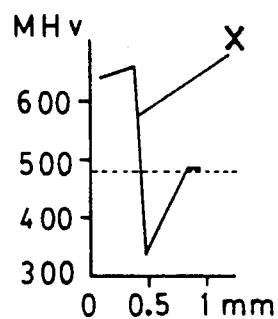
FIG. 8(a) to (e) graphically show model hardness profiles across the cross section which are utilized in determining the tempering result in the region of the welds.
Figure 8B:
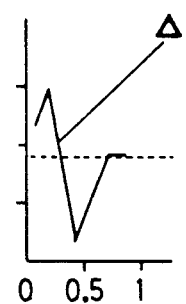

FIG. 8(a) ... The magnitude of the tempering current is too low to produce an effective tempering effect; wrong ... x FIG. 8(b) ... There exists regions having an increased level of hardness, indicating a dissatisfactory tempering effect; but the products are determined as can be offered for practical use in consideration of other experimental results including a tensile strength test; representing the lower limit of the tempering current ... Δ

Figure 8C:
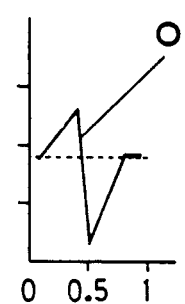

FIG. 8(c) ... The desired tempering effect is substantially achieved ... o

Figure 8D:
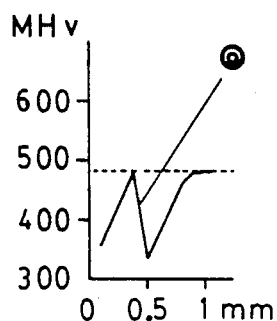

FIG. 8(d) ... A tempering current of an ideal magnitude has been supplied to restore the same degree of hardness in the welds as in the host material, representing the upper limit of the tempering current ... ⊚

Figure 7A:
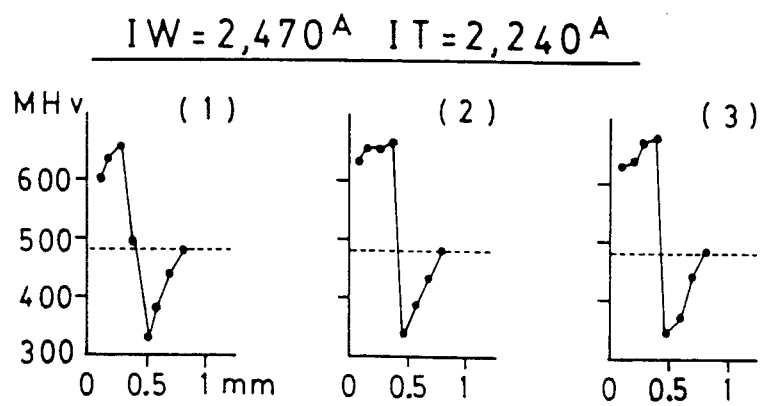
FIGS. 7(A) to (E) graphically show experimental results which are indicated in order to describe a third embodiment of the invention, the graphs shown in each of FIGS. (A) to (E) indicating the distribution of the hardness over the cross section of the main member in the region of the weld of three samples when the magnitude of the welding current and the tempering current is varied.
Figure 7B:
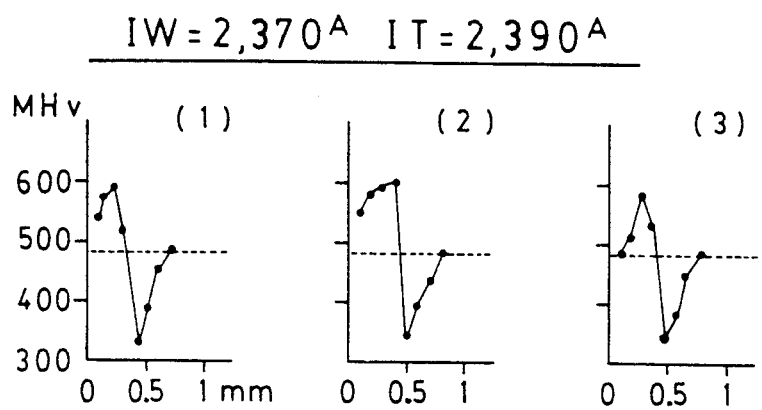
Figure 7C:
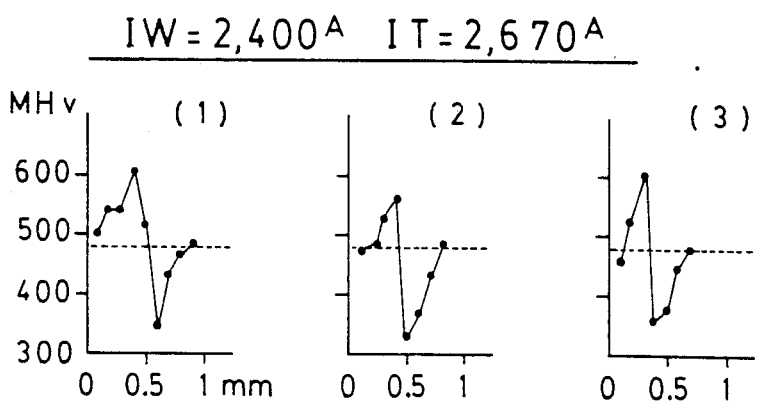
Figure 7D:
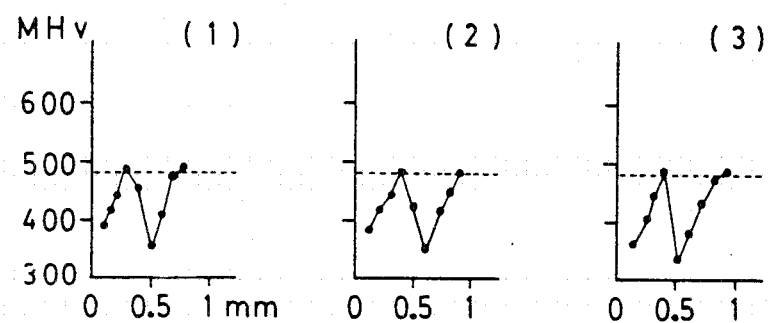
Figure 7E:
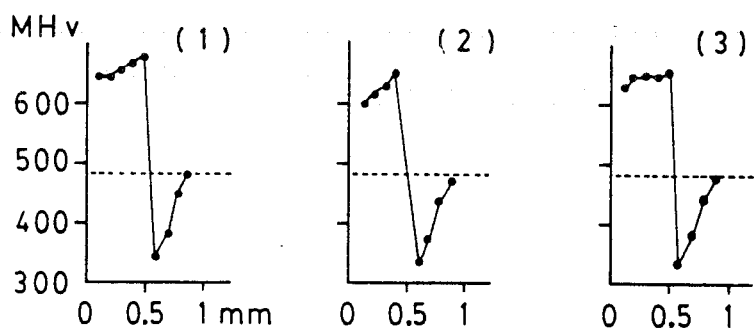
Figure 8E:
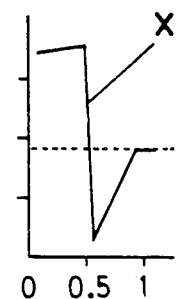

FIG. 8(e) ... The magnitude of a tempering current is too high, causing an increased degree of quench hardening, being a wrong condition ... x (2) Results of determination
  Based on the criteria mentioned above, the hardness curves of the individual samples shown in FIG. 7 can be determined to be as follows:

FIG. 7(A) ... corresponds to FIG. 8(a), and hence is no good (x).
  FIG. 7(B) ... corresponds to FIG. 8(b) and is good (Δ).
  FIG. 7(C) ... corresponds to FIG. 8(c) and is better than that of FIG. 7(B) (Δ).
  FIG. 7(D) ... corresponds to FIG. 8(d), and is best ( ⊚ ).
  FIG. 7(E) ... corresponds to FIG. 8(e), and is no good (x).

Figure 9:
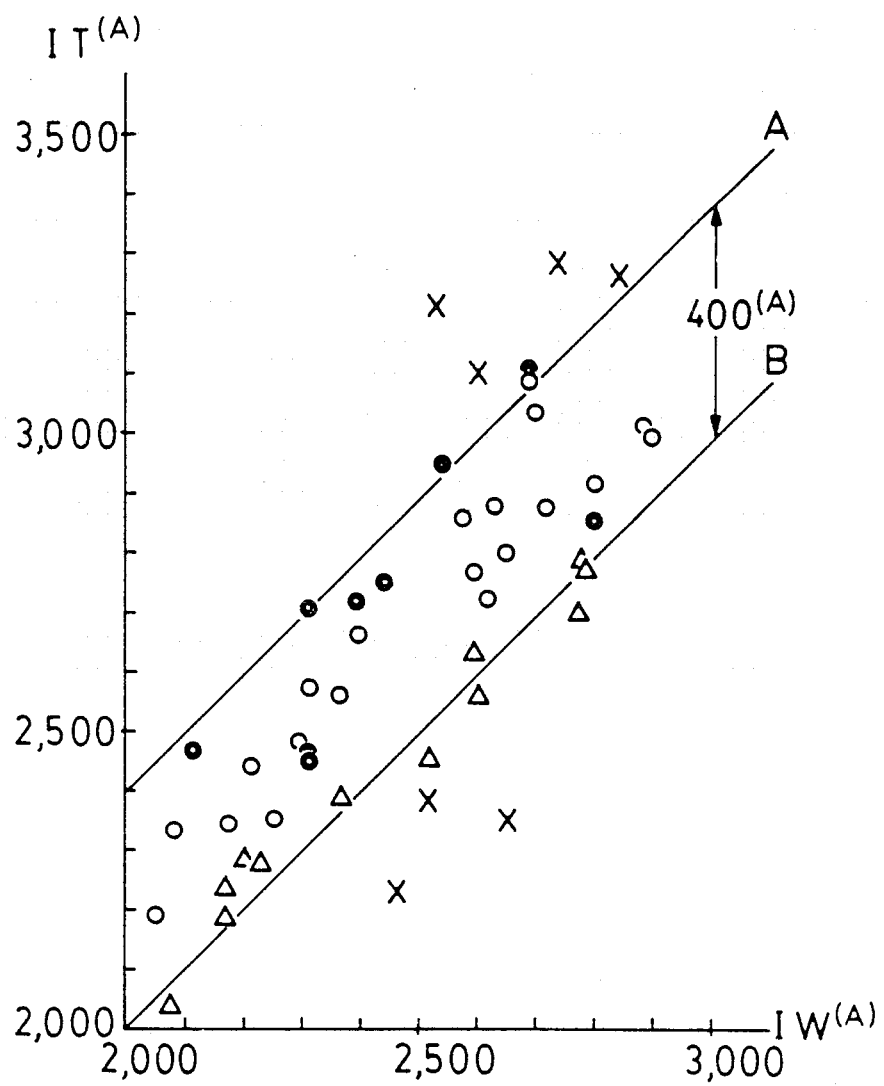
FIGS. 9(a) and (b) graphically show the distribution of the tempering result of each sample as viewed in relation to the magnitude of the welding current and the tempering current.
Figure 9:
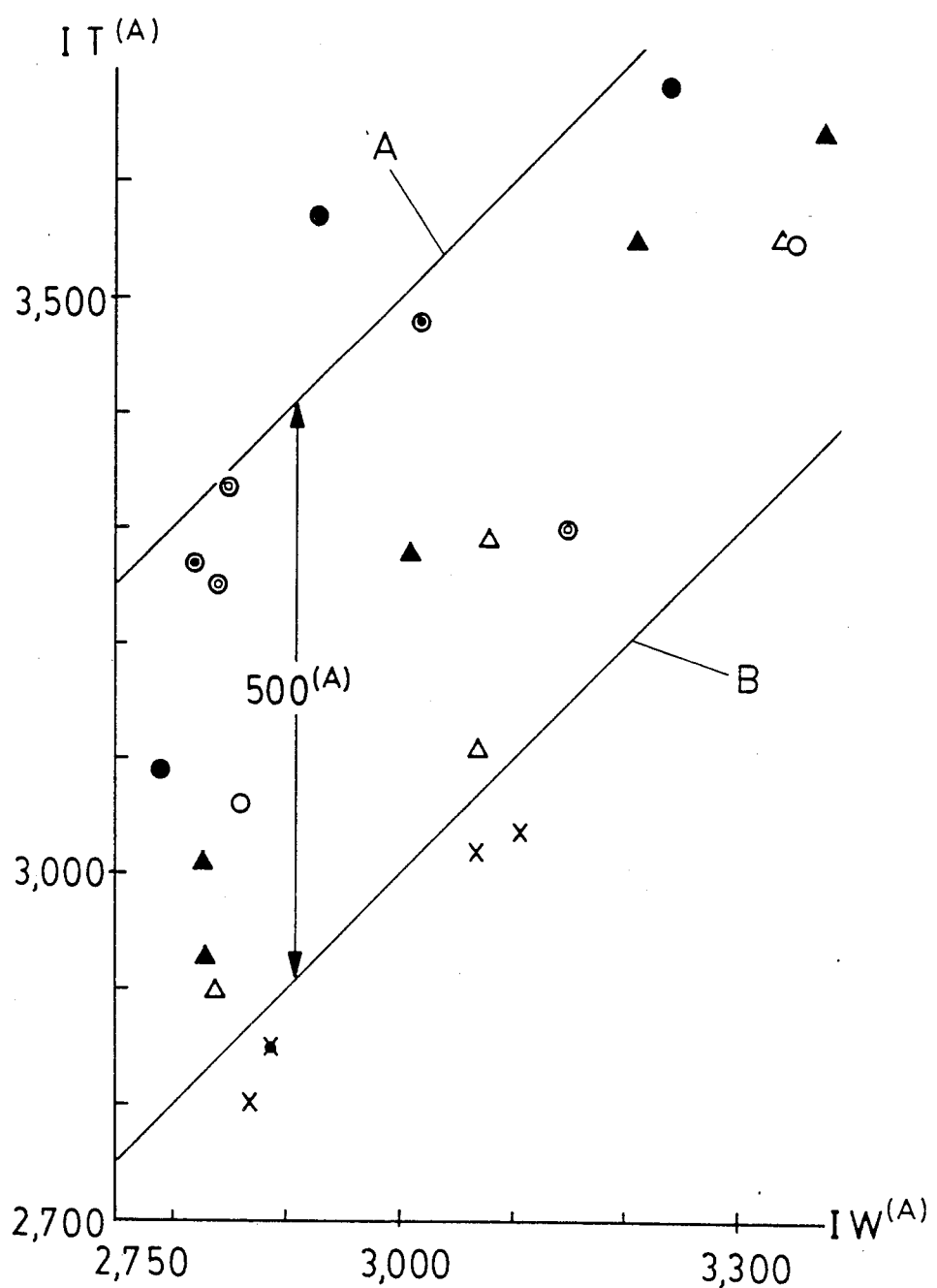

By utilizing a similar procedure, the hardness data of the entire samples can be determined, and the relationship between the welding current IW and the tempering current IT is graphically shown in FIG. 9(a), by plotting the individual values of these currents.

FIG. 9(b) similarly graphically shows the relationship between the welding current and the tempering current, prepared in the same manner as illustrated in FIG. 9(a) by utilizing experimental results which have been obtained from reinforcing cages formed in the same manner as before, utilizing main members having diameters of 7.4 and 11 mm and auxiliary members having a diameter of 4.0 mm. In FIGS. 9(a) and 9(b), the welding current IW is plotted on the abscissa while the tempering current IT is plotted on the ordinate. The determination of the tempering effect of the individual samples are represented by ⊚ (best), ● (better), Δ (good) and X (no good) for the main members having diameters of 7.4 mm, and by ⊚ (best), o (better), Δ (good) and x (no good) for main members having diameters of 11 mm.

Referring to FIG. 9(a) which shows the results of determination rendered on samples in which an auxiliary member having diameters of 3.2 mm is welded to main members having diameter of 7.4 mm, followed by an associated tempering operation, it will be seen that a satisfactory tempering effect is achieved for magnitudes of the tempering current IT which lie in a range shifted from substantially 0 to 400 amperes upward as compared with the range of the tempering current IT, as indicated by lines A and B which indicate the upper and the lower limit of such range. Referring to FIG. 9(b) which shows the results of determination rendered on samples in which the auxiliary member having diameters of 4.0 mm are welded to main members having different diameters of 7.4 and 11 mm, respectively, followed by an associated tempering operation, it will be seen that a satisfactory tempering effect is again achieved with those magnitudes of the tempering current IT which lie in a range that is shifted from substantially 0 to 500 amperes above the range of the welding current IW, as indicated by lines A and B which incicate the upper and the lower limit of such range. Accordingly, it is found that a proper tempering operation can be accomplished by establishing the magnitude of the tempering current IT in a range which is from substantially 0 to 500 amperes higher than the magnitudes of welding current IW, even though the effective values may depend, to a degree, on the diameters of the main and the auxiliary members and their materials.

In addition to establishing the correlation between the welding and the tempering current, the invention also provides a method of and an apparatus for forming a reinforcing cage in which any distortion in the configuration of the reinforcing cage is eliminated and in which no torsional stress is applied to the main members which form the reinforcing cage, these representing a fourth and a fifth embodiment of the invention, both of which provide a substantial improvement over the prior art.

Specifically, in the fourth embodiment of the invention, there is provided a method of forming a reinforcing cage with an apparatus including a rotary welding and a rotary tempering electrode, both of which rotate around a cylindrical stationary electrode, around which main members and an auxiliary member are disposed, with a given spacing from the outer periphery of the stationary electrode and which are energized to weld and temper the crossings of the main members and the auxiliary member while urging such crossings toward the stationary electrode; the method comprising the steps of supporting the welding and the tempering electrode for rotation by disposing them on a rotary drum which is disposed in coaxial relationship with the stationary electrode, driving the rotary drum by an induction motor providing a slow starting of the induction motor at the initiation of the operation of the apparatus by applying a fraction of the rated voltage to the motor, and starting a spool which stores a supply of auxiliary member which is fed along a path over the stationary electrode for crossing with the main members, by applying a torque of a magnitude which is greater than a steady-state torque, thereby achieving a simultaneous starting of the rotary drum and the spool.

In other word, the method of forming a reinforcing cage according to this embodiment accommodates for a difference in the moment of inertia $GD^2$ of the spool and the rotary drum.

Figure 10A:
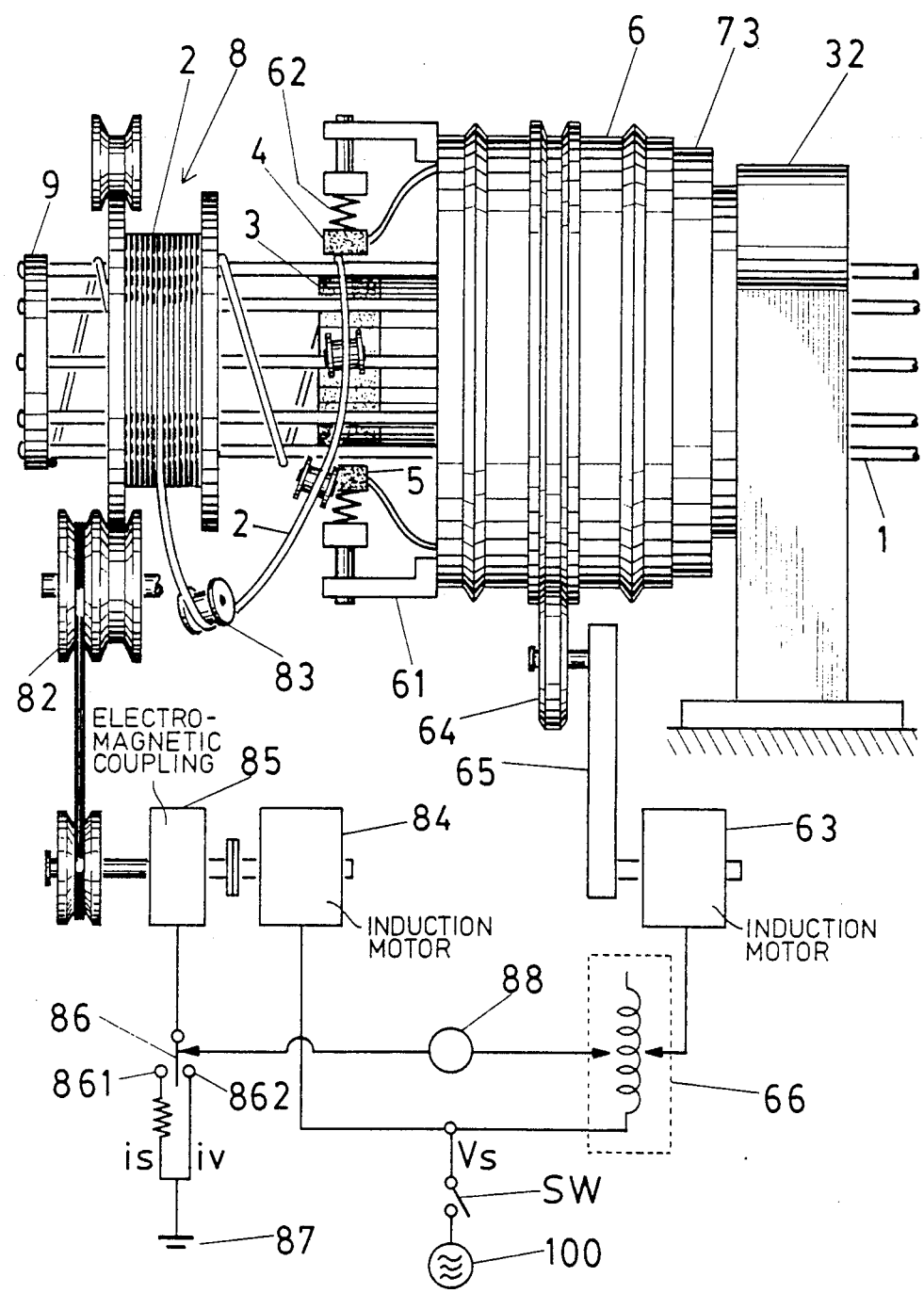
FIG. 10(a) is a front view of part of an apparatus according to a fourth embodiment of the invention, including an associated electrical circuit.
Figure 10B:
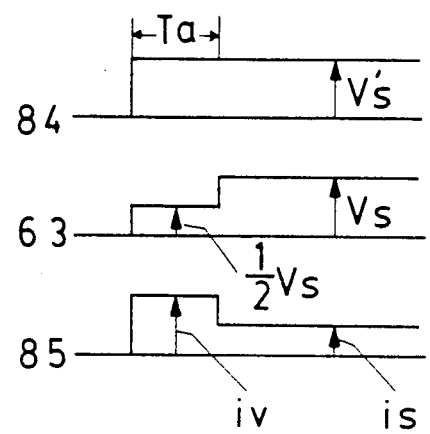
FIG. 10(b) graphically shows timing charts of several voltages appearing in the circuit of FIG. 10(a)

An arrangement according to this embodiment is illustrated in FIGS. 10(a) and 10(b). Referring to FIG. 10, there is shown an induction motor 84 which is connected through an electromagnetic coupling 85 to drive a drive roll 82 associated with the spool 8. In this embodiment, the output shaft of the coupling 85 is connected with the drive roll 82 by a belt, but any other coupling means may be used. The induction motor 84 has such a capacity that a fraction of its rated torque corresponds to the steady-state torque of the spool 8. The electromagnetic coupling 85 is excited by a d.c. source 87 through a changeover switch 86 including a pair of contacts 861 and 862. When the switch 86 is thrown to a position in which the contact 861 is connected in circuit, a fractional exciting current is, hereafter referred to as a steady-state exciting current, is supplied to the coupling to develop the steady-state torque. When the contact 862 is connected in circuit, the source 87 supplies a rated current iv, hereafter referred to as "starting overexciting current", which develops the rated torque. The operation of the changeover switch 86 is controlled by an output from a timer 88 which establishes a necessary starting time Ta. When the necessary starting time Ta passes after the contact 861 has been connected in circuit, the changeover switch 86 changes its position, connecting the contact 862 in circuit. There is provided another induction motor 63 which is adapted to drive a drive roll 64 associated with the rotary drum 6. As shown, a transmission 65 is interposed between the motor 63 and the roll 64. The capacity of the motor 63 is chosen such that its rated torque corresponds to the steady-state torque of the rotary drum 6. As shown, the motor 63 is fed from an a.c. source 100 through a voltage regulator 66 such as a tapped reactor. In this manner, it is possible for the motor 63 be fed from the half-voltage tap on the voltage regulator 66 until the necessary starting time Ta passes, whereupon it is fed from the source 100 through the full voltage tap.

In the operation of the arrangement for forming a reinforcing cage, a power switch SW is closed to feed both induction motors 84, 63 simultaneously with a.c. voltages. However, it is to be noted that the rated voltage Vs' is applied to the motor 84 to start it at its full voltage so as to produce a rated torque therefrom whle one-half the rated voltage ½ Vs is fed to the motor 63 to cause its slow starting. At the same time as the a.c. voltage is applied, the electromagnetic coupling 85 is fed through the contact 862 with an exciting current which achieves the maximum coupling between its input and output shafts, namely, the exciting current of rated level iv, which continues during the starting time Ta.

As a result, when starting its rotation, the spool 8 having an increased value of $GD^2$ is driven by the rated torque from the induction motor 84 which is greater than the magnitude of its steady-state torque. On the other hand, the rotary drum 6 having a reduced value of $GD^2$ undergoes a slow starting as a result of torque supplied thereto which is less than its steady-state torque. Consequently, after a relatively short interval after the starting, the given speed relationship is established between the spool 8 and the rotary drum 6. This interval corresponds to the starting time Ta established by the timer 88, and can be determined by experiments or calculation. After the starting time Ta passes, the contact 861 is closed, whereby the steady-state exciting current is supplied to the electromagnetic coupling 85 and simultaneously the induction motor 63 is supplied with the rated voltage, so that both the rotary drum 6 and the spool 8 are driven with their steady-state torque, thus maintaining the given speed relationship.

As discussed above, in accordance with the invention, the spool 8 having a greater value of $GD^2$ is started by supplying a torque thereto which exceeds its steady-state torque while the rotary drum 6 having a reduced value of $GD^2$ starts by being supplied with a torque which is less than its steady-state torque. As a result, the required speed relationship is established between the spool 8 and the rotary drum 6 within a short interval after the initiation of operation, thus facilitating a simultaneous starting of the both members. Consequently, both the welding electrode 4 and the tempering electrode 5 are capable of welding the auxiliary member 2 to the individual main members 1 and tempering the welds as the auxiliary member follows the normal circular path around the set 10 of main members.

In the fifth embodiment of the invention, there is provided an electrode structure for an apparatus for forming a reinforcing cage, which is characterized by a plurality of guide bars, equal in number to the number of main members, and disposed along the periphery of the cylindrical stationary electrode in circumferential separation.

Figure 11A:
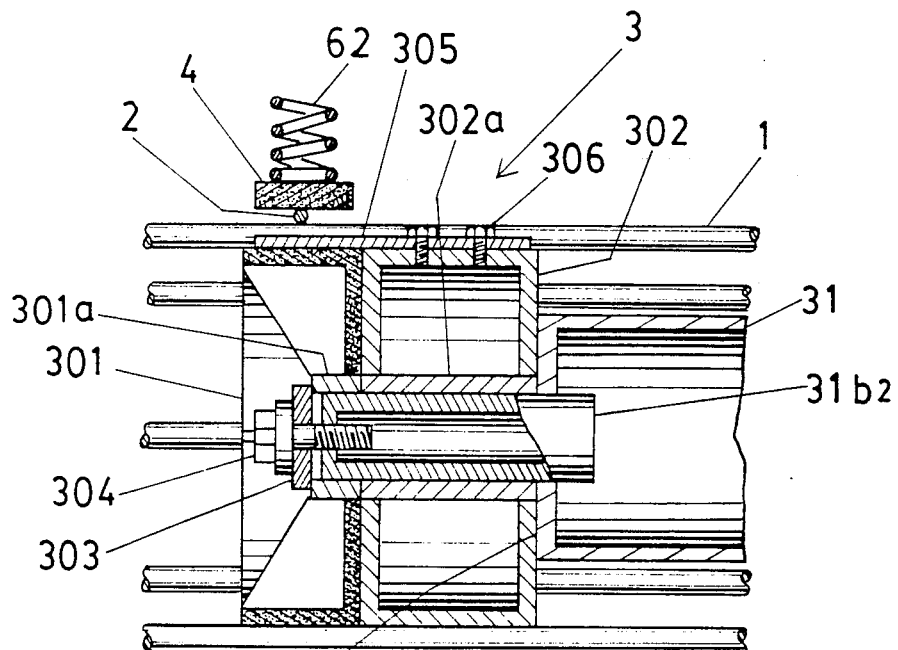
FIG. 11(a) is a front view, partly in section, of part of an apparatus for forming a reinforcing cage according to a fifth embodiment of the invention.
Figure 11B:
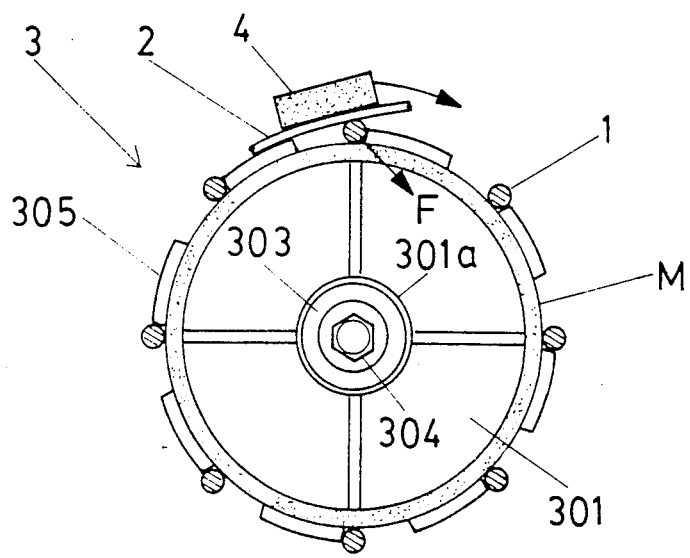
FIG. 11(b) is a left-hand side elevation of the apparatus shown in FIG. 11(a)

A stationary electrode according to the fifth embodiment which is used in an apparatus for forming a reinforcing cage is shown in FIGS. 11(a) and 11(b), which are a front view and a side elevation, respectively. Specifically, the stationary electrode 3 comprises a sleeve-shaped electrode section 301 having a reduced axial length and which is disposed in opposing relation with the welding electrode 4, and a hollow cylindrical conductor section 302 which has the same outer diameter as the electrode section 301. The electrode section 301 may be formed of a copper, for example, while the conduction section 302 may be formed of aluminium, for example. Each of the sections 301, 302 has a hollow shaft 301a or 302a centrally, both of which has an equal inner diameter. The conductor 31 includes and end wall 31b1, from which extends a connecting shaft 31b2 having an outer diameter which permits it to be fitted into the hollow shaft 301a, 302a and which has an axial length slightly less than the combined length of the both hollow shafts 301a, 302a. Remote end of the connecting shaft 31b2 is centrally formed with a threaded bore which can be engaged by a bolt. Thus, by sequentially fitting the hollow shafts 301a and 302a over the connecting shaft 31b2, applying an abutment disc 303 having an opening through which the bolt can pass, against the end face of the hollow shaft 301a of the electrode section 301, and inserting a clamping bolt 304 through the opening, from outside the abutment disc 303, into threadable engagement with the threaded bore in the connecting shaft 31b2 and clamping it, both the electrode section 301 and the conductor section 302 can be integrally connected together and electrically connected together with the conductor 31, with their adjacent end walls tightly abutting against each other.

A plurality of guide bars 305, which are equal in number to the number of main members 1, are distributed around the periphery of the conductor section 302 at a given circumferential spacing therebetween and secured thereto by means of bolts 306, the guide bars extending axially to a region of the periphery of the electrode section 301. These guide bars 305 are rectangular as viewed in plan view, having a thickness which is slightly less than the diameter of the main members 1 and a width which is less than the spacing between adjacent main members, and are arcuate as viewed in end view. When the electrode section 301 and the conductor section 302 are connected together, the guide members 305 are positioned in a manner such that their one sides, located on the same side as viewed in a given circumferential direction, form an angle which is substantially equal to an angle subtended by a pair of adjacent main members 1 and such that the main members 1 run along those sides of the guide members which are advanced with respect to the other, as viewed in the direction of rotation of the welding electrode 4.

In operation, each of the main members 1 runs in substantially sliding contact with one side of a corresponding one of the guide bars 305, as indicated in FIG. 11(b). Accordingly, during a welding operation, the force F which is applied to the main member 1 from the welding electrode 4, in a direction indicated by an arrow or in a direction of rotation thereof, is resisted by an associated one of the guide members 305, removing any likelihood that a torsional stress may be applied to the main member 1. In this manner, a reinforcing cage which is free from distortion can be formed.

In addition, the welding electrode 4 presses against the main member 1 with the auxiliary member 2 interposed therebetween while it slides over the guide bar 305, namely, at an elevation above the peripheral surface M of the stationary electrode, and then moves over to the adjacent guide bar 305. Consequently, the welding electrode 4 depicts a locus around the peripheral surface M of the stationary electrode which is smooth and close to a circle, substantially suppressing the occurrence of any sparking.

Furthermore, the stationary electrode 3, which has been an integral member in the prior art practice, is divided into the electrode section 301 and the conductor section 302 in accordance with the invention, with the guide bars 305 fixedly mounted on the conductor section 302 and extending to a region over the electrode section 301. Accordingly, if the peripheral surface M of the stationary electrode become unusable as a result of abrasion and damages caused by the welding operation in regions where the main member 1 slide therealong after use over a given period, the clamping bolt 304 may be loosened to displace the electrode section 301 through an angle circumferentially to thereby change the regions which are located for abutment against the main members 1. Subsequently, the electrode section 301 may be clamped again. By repeating such angular displacement, the entire peripheral surface of the electrode section 301 can be effectively utilized. As a result, it is possible to maintain the same useful life of the stationary electrode 3 as before even though the guide bars 305 are mounted thereon.

In a sixth embodiment of the invention, the construction of the conductors which are utilized to connect the stationary electrode, the welding and the tempering electrode with the power source is improved in order to overcome the disadvantages initially mentioned. Specifically, in the sixth embodiment of the invention, there is provided a conductor structure for electrically interconnecting the stationary electrode with a welding power supply for use in an apparatus for forming a reinforcing cage in which crossings of main members and an auxiliary member are welded together as a welding and a tempering rotary electrode, both mounted on a rotary drum, moves angularly around a cylindrical stationary electrode, with the both members being interposed between the both electrodes. The conductor structure comprises a hollow cylindrical conductor fixedly mounted for electrically connecting the stationary electrode with the welding power supply and having an outer diameter which is close to the inner diameter of the rotary drum, the circumferential one-half of the cylindrical conductor being formed with notched slots, the conductor having a closed end wall disposed alongside the stationary electrode and in which a plurality of openings are formed to allow the set of main members to extend therethrough from within the cylindrical conductor to the outside thereof, the stationary electrode being detachably mounted centrally on the closed end wall, the circumferential one-half of the cylindrical conductor being located opposite to a feeding brush dispose in sliding contact with collector rings mounted on the periphery of the rotary drum for connection of the welding and the tempering electrode with respective power supplies.

Figure 12A:
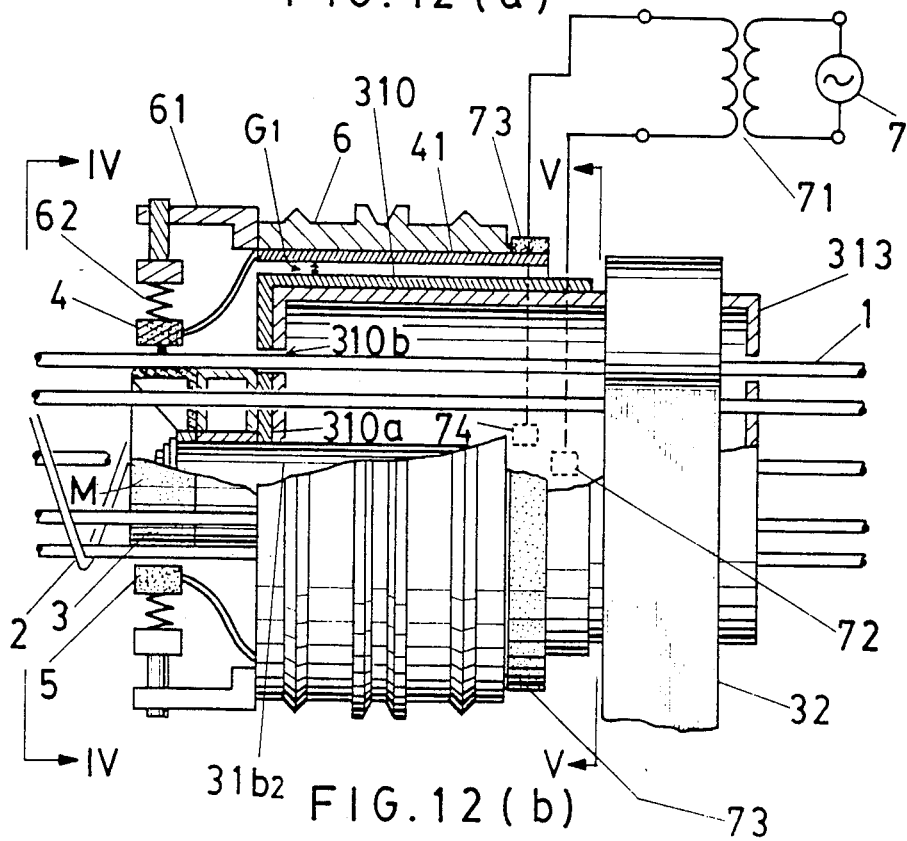
FIG. 12(a) is a front view, partly broken away, of an apparatus for forming a reinforcing cage according to a sixth embodiment of the invention.
Figure 12B:
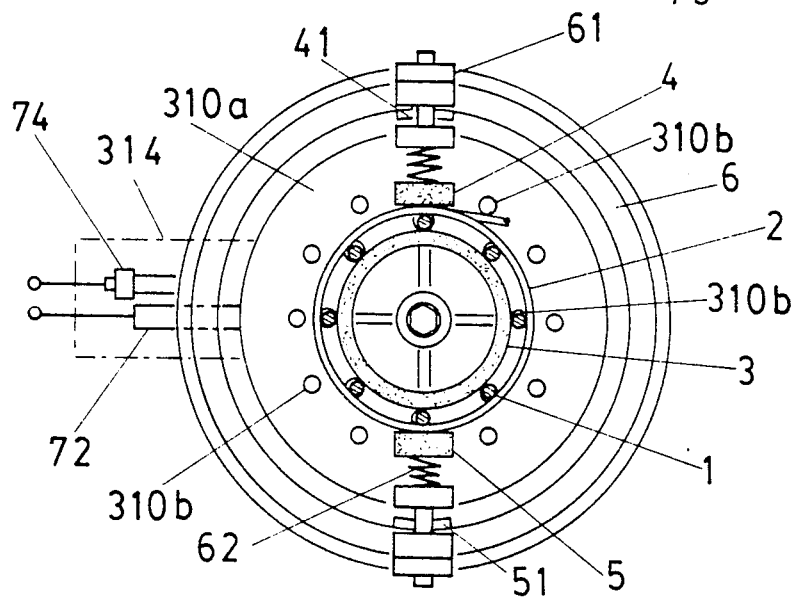
FIG. 12(b) is a left-hand side elevation of the apparatus shown in FIG. 12(a), as viewed along the line IV—IV.
Figure 12C:
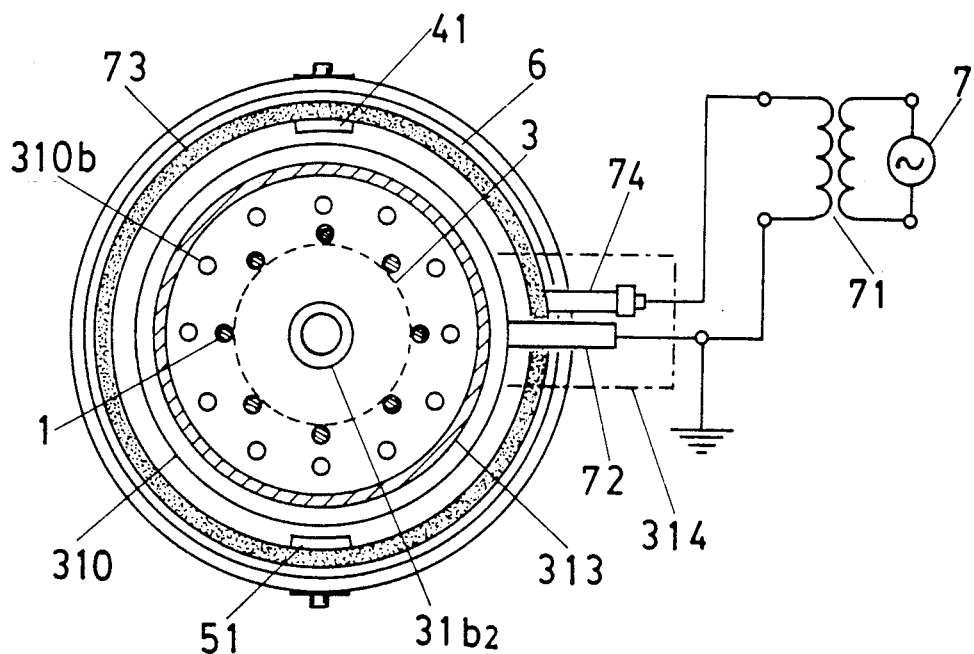
FIG. 12(c) is a right-hand side elevation of the apparatus shown in FIG. 12(a), as viewed along the line V—V.
Figure 12D:
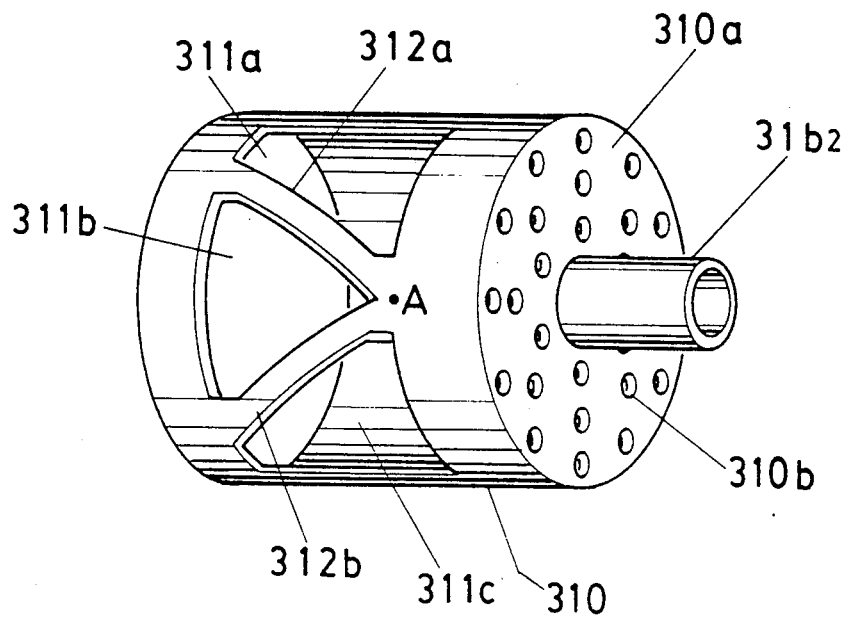
FIG. 12(d) is a perspective view of a construction used in the apparatus of FIG. 12(a)

The sixth embodiment will be described in detail below with reference to FIGS. 12(a) to 12(d). In these Figures, a conductor 310 is associated with a stationary electrode 3 and has a hollow cylindrical configuration having an outer diameter which is close to the inner diameter of the rotary drum 6. An insulating member 313 is applied to the internal surface of the conductor 310. The conductor 310 is supported through the insulating member 313 by a standard 32 in coaxial relationship with and inside the rotary drum 6, with a clearance $G_1$ left between the conductor and strip conductors 41, 51 associated with the welding and the tempering electrode 4, 5, respectively. As shown in FIG. 12(d), the circumferential one-half of the conductor 310 is formed with notches 311a, 311b and 311c in a sequential manner as viewed in the circumferential direction, with bars 312a, 312b left therebetween. It will be noted that the bars 312a, 312b extend from the open end of the conductor 310 toward the closed end wall 310a thereof, and merge together adjacent to the closed end wall 310a at a point which is centrally located in said one-half, as viewed in the circumferential direction. The conductor 310 is set in a manner such that its one-half in which the notched slots 311a–311c are formed are directed toward a feeding brush 74. It is desirable that a parting line which circumferentially divides the combined area of the notched slots 311a to 311c into equal areas, as viewed in the circumferential direction, or a parting line extending through the point A where the bars 312a, 312b merge together as considered in the example shown, be located opposite to the feeding brush 74. In the vicinity of the open end of the conductor 310, or adjacent to the right-hand end as viewed in FIG. 12(a), the conductor is connected to a welding transformer 71 through interconnecting conductor 72. The stationary electrode 3 which is constructed in a manner illustrated in FIG. 11 is detachably mounted on the opposite end or end wall 310a and is electrically connected therewith. The end wall 310a is regularly formed with a plurality of openings 310b through which the main members extend. Each of the main members 1 extends inside the conductor 310 and extends through a corresponding one of the openings 310b to extend along the cylindrical surface M of the stationary electrode 3. An insulating member 313 is applied to the internal surface of the conductor 310. To reduce the impedance of the feeder 314, it is desirable that the point of connection between the conductor 310 and the welding transformer 71 be located close to the feeding brush 74 as shown.

With this arrangement, the inside of the conductor 310 provides a path along which the set 10 of main members runs, and each of the main members 1 passes inside the conductor 310 to ride the peripheral surface M of the stationary electrode 3. The diameter of the conductor 310 may be increased so as to bring its outer peripheral surface close to the conductors 41, 51 ($G_1 << G$), thus reducing the impedance between the conductor 310 and the conductors 41, 51 in a corresponding manner. This permits the welding voltage, that is, the output voltage from the welding transformer 71 to be reduced. In this arrangement, the one-half of the conductor 310 in which the notched slots 311a to 311c are formed has a quantity of conductor which is less than the quantity of conductor in the remaining half by an amount which is equal to the total area of the notched slots, so that the welding current which passes through the one-half containing the notched slots 311a to 311c is reduced as compared with an arrangement in which no such notched slot is formed. In other words, the apparent impedance of the conductor 310, as viewed in the circumferential direction, is greater in the one-half containing the notched slots than in the remainder. AS a result, the overall impedance inclusive of the feeding brush 74 and the welds is reduced and is rendered more uniform than in the conventional arrangement. This means that a stable flow of welding current, which is free from fluctuation, is maintained through the set 10 of main members, irrespective of the disposition of the main members in the circumferential direction.

In the described embodiment, three notched slots 311a to 311c have been provided, but the number of such slots may be reduced or increased as desired.

In the described embodiment, the sixth embodiment has been illustrated with reference to its relationship with the conductor 41 associated with the welding electrode 4, but the same arrangement may be employed with respect to the tempering electrode 5.

Thus, according to the sixth embodiment, a damaging of the main members which results from the sparking experienced with a conventional arrangement is substantially completely prevented, and the crossings between the main members and the auxiliary member are homogeneously welded and tempered as viewed in the circumferential direction of the resulting reinforcing cage.

Figure 13:
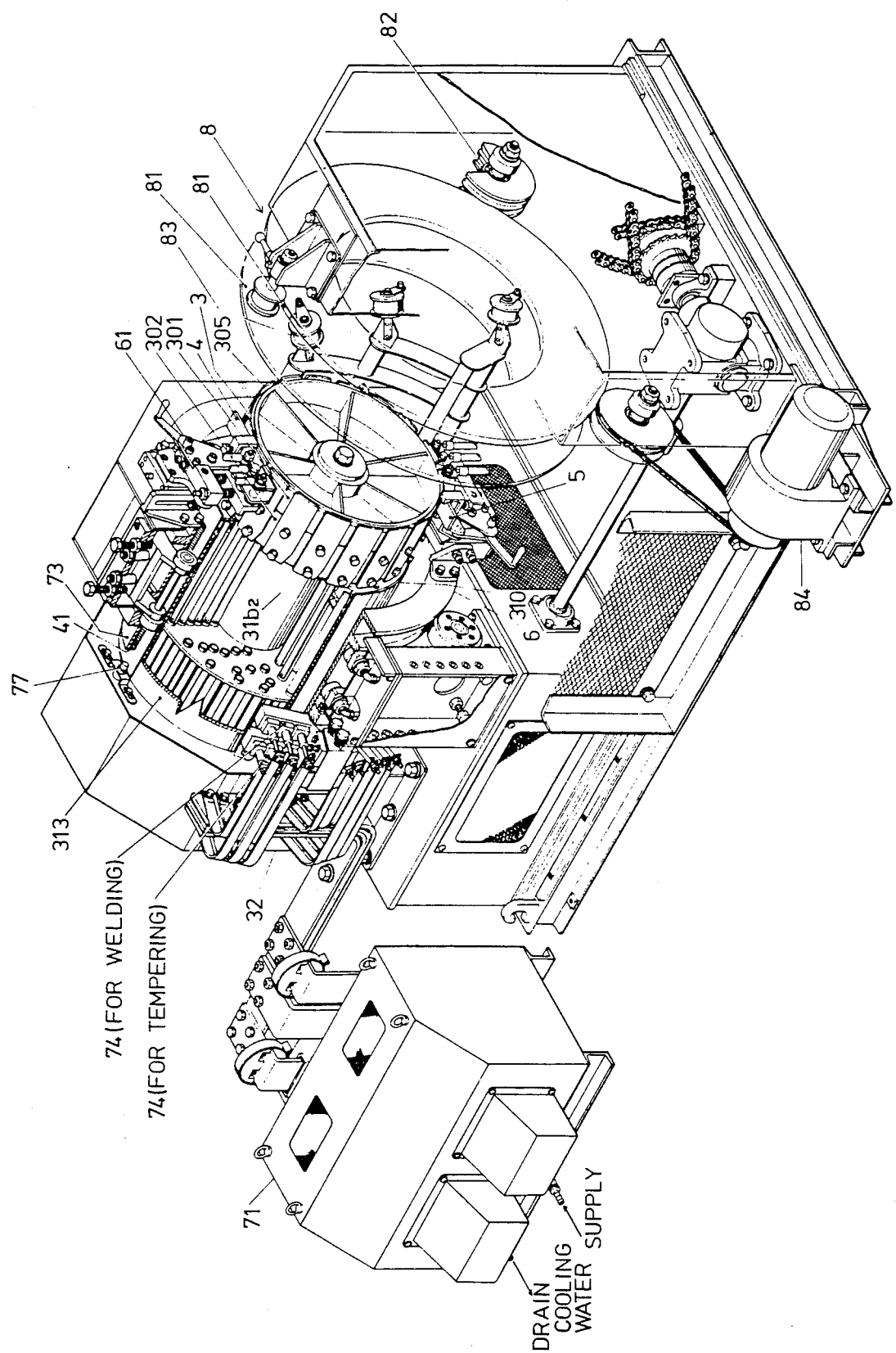
FIG. 13 is a perspective view, partly broken away, of an arrangement for forming a reinforcing cage in which the various embodiments shown in FIGS. 5 to 12 are combined.

FIG. 13 shows an overall apparatus for forming a reinforcing cage, in a perspective view, partly removed, which incorporates the first to the sixth embodiment. It is to be understood that a casing which contains an energization control as well as a mechanism for pulling a reinforcing cage as it is being formed, by engagement with buttonheads formed on one ends of the main members, are not shown in FIG. 13.

A confirmation test has been made to determine if a reinforcing cage manufactured with the arrangement shown in FIG. 13 exhibits expected effects.

Confirmation test (1) Samples

Using an arrangement for forming a reinforcing cage as shown in FIG. 13 and incorporating the novel proposals as disclosed above in connection with the first to the sixth embodiments, a plurality of PC piles have been fabricated by employing main members and auxiliary members as indicated below under the welding conditions also indicated below to form reinforcing cages. A tension which corresponds to 70% of the tensile strength of the main members is introduced into the set of main members which are used in a reinforcing cage, and the main members are disposed in a form below a concrete is cast into the latter for centrifugal molding. After steam curing, the prestress is introduced.

Main members:
    JIS (Japan Industry Standards) G3109, deformed PC steel bars D-1;
    Yield point—130 kgf/mm$^2$
    Tensile strength—145 kg/mm$^2$ or greater
    Elongation—5% or greater
    Diameter—7.4 mm $\phi$ Auxiliary member:
    JIS G3505 soft steel wire
    Diameter—3.2 mm The pressure applied to welding and tempering electrodes:
    40 kg f, an optimum value determined from a number of experimental runs Welding current:
    2,400 amperes, passed for 2 cycles (60 Hz)

Tempering current:
    2,730 amperes, passed for 2 cycles (60 Hz)

Number of revolutions of the rotary drum:
    40 rpm

Reinforcing cages formed:
    in two kinds, one having a diameter of 245 mm when six PC steel bars are used and another having a diameter of 290 mm when eight PC steel bars are used, with lengths in a range from 9 to 15 m.

Cement used:
    JIS R5210 normal Portland cement

Figure 14:
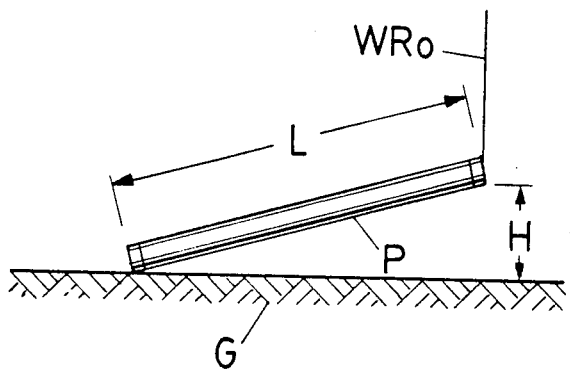
FIG. 14(a) is a schematic view of a testing procedure which is utilized to determine the impact resistance of a PC pile incorporating the reinforcing cage formed according to the invention.
FIG. 14(b) graphically shows the measured values of the impact resistance of the PC piles incorporating the reinforcing cage of the invention, as compared with the impact resistance of the PC piles incorporating usual reinforcing cages, which impact resistance is determined in accordance with the testing procedure illustrated in FIG. 14(a).
Figure 14:
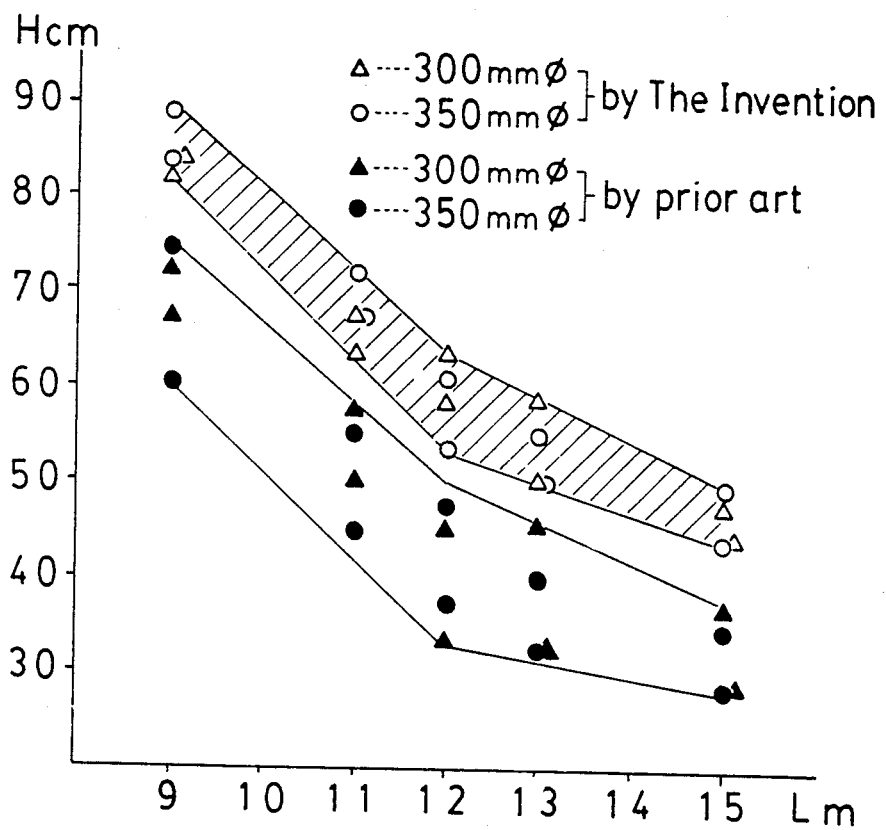

Size of PC pile samples fabricated:
    Diameter: two varieties, 300 and 360 mm
    Length—in a range from 9 to 15 m
    Wall thickness of concrete cylinder of PC pile—60 mm for both diameters (2) Testing procedure The samples mentioned above, as well as two kinds of piles fabricated with a conventional arrangement and according to a conventional method in the same sizes as the samples, utilizing the same main members and auxiliary member as used in the samples, have been subjected to an impact test in a manner as illustrated in FIG. 14(a), thus comparing their impact resistance. In FIG. 14(a), one end of a pile P is placed on the earth which is tamped to achieve the same condition as the building site while the other of the pile is suspended by a wire rope WRo. The impact test comprises changing the elevation H above the earth of the remote end of the pile which is suspended by the wire rope WRo suitably in a range from 290 to 900 mm, and determining the particular value of the elevation at which the pile is destroyed when the wire rope WRo is cut.

(3) Results of test

FIG. 14(b) represents the elevation at which the pile is destroyed when the wire rope is cut, taken on the ordinate, plotted against the length L of the pile which is shown on the abscissa. As will be apparent, the samples of the reinforcing cage fabricated according to the method and with the apparatus of the invention are distributed in a hatched area, which is located above a corresponding area in which the piles fabricated according to the conventional method and with the conventional apparatus are distributed, thus demonstrating a significant improvement in the impact resistance.

To add, in the reinforcing cages fabricated according to the invention, there was no crossings or welds where the auxiliary member is separated from the main members under the tension applied to the set of main members during the formation of the piles.

While the invention has been specifically shown and described above in terms of specific embodiments, it should be understood that a number of modifications, changes and variations are possible therein without departing from the spirit and the scope of the invention, but that the scope of the invention is to be solely determined on the basis of the appended claims.

What is claimed is:

1. In apparatus for forming a reinforcing cage for prestressed concrete pile including a cylindrical stationary electrode, and a welding and a tempering electrode, both of which are adapted to rotate simultaneously in a same direction around the periphery of the stationary electrode with a given gap therebetween, a set of main members in the form of a plurality of steel bars which are to be ultimately incorporated into the prestressed concrete pile being disposed around the stationary electrode in parallel relationship with the axis thereof and with a given circumferential spacing therebetween and being slidable in one axial direction, an auxiliary member being helically wound around the bank of main members, with crossings between the main members and the auxiliary member being welded together by passing a welding current for a given cycle across the welding and the stationary electrode through a selected one of the crossings while simultaneously urging said one crossing toward the stationary electrode by means of the welding electrode, the welded crossing being tempered by passing a tempering current for a given cycle across the tempering and the stationary electrode through the crossing while simultaneously urging the crossing toward the stationary electrode by means of the tempering electrode, the welding and the tempering current being repeatedly applied to weld and temper successive crossings; the improvement which comprises a thyristor connected in circuit across the welding electrode and the stationary electrode, an electrode position detector for detecting the location of the welding electrode where a welding operation is to take place, a welding current detector for detecting a welding current, a synchronous starter responsive to an output from the electrode position detector for producing an energization initiation timing signal and an energization time controlling signal of a given duration which establishes the duration during which the welding current is to be passed, and a firing control responsive to the energization initiation timing signal for producing an energization confirmation time interval signal of a duration which is less than the duration of the energization time controlling signal, the thyristor being associated with a firing circuit which is supplied with a firing control signal from the firing control only if at least one of the energization confirmation time signal and a detection signal from the welding current detector is present concurrent with the energization time controlling signal which is input thereto.

2. An apparatus according to claim 1 in which the firing control produces a signal which is synchronized with and which has the same duration as the energization confirmation time signal, the signal being supplied to the firing circuit associated with the thyristor as a firing time adjusting signal.

3. In a method of forming a reinforcing cage for prestressed concrete pile including the steps of providing a welding and a tempering rotary electrode which rotate simultaneously in the same direction around the periphery of a cylindrical stationary electrode with a given spacing therebetween, disposing a set of main members in the form of a plurality of steel bars which are to be ultimately used in the prestressed concrete pile so as to be spaced apart circumferentially and slidable axially in parallel relationship with the axis of the stationary electrode, winding an auxiliary member in a helical configuration around the set of main members, causing the welding electrode to urge a crossing of the main member and the auxiliary member toward the stationary electrode while simultaneously passing a welding current between the welding and the stationary electrode for a given cycle through the crossing to thereby weld both members together, and causing the tempering electrode to urge the welded crossing toward the stationary electrode while simultaneously passing a tempering current between the tempering electrode and the stationary electrode through the crossing to thereby temper the weld, the welding current and the tempering current being repeatedly passed across the welding and the tempering electrode and the stationary electrode to weld and temper successive crossings to thereby form a reinforcing cage; the improvement comprising the steps of, when the welding electrode reaches a crossing to be welded, generating an energization indication timing signal, which initiates an energization cycle for passing the welding current for the given cycle through the crossing, simultaneously with an energization confirmation time interval signal of less duration in time than the energization cycle for the welding operation, detecting the presence of the welding current, and interrupting the energization cycle for welding and the flow of welding current if insufficient welding current is detected when the energization confirmation time interval is over so that the crossing remains unwelded, and thereafter in response to said interuption, preventing the tempering current from being applied to such unwelded crossing.

4. The method of claim 3 in which, while passing the welding current between the welding and the stationary electrode, sufficient welding current is detected after the given energization confirmation time interval has passed, allowing the welding to be continued for the given cycle to weld the crossing and generating an energization indication timing signal, which initiates a tempering cycle for passing tempering current for the given cycle through the welded crossing, only if the energization cycle for welding has been permitted to continue.

5. The method of claim 3 in which, when the tempering current is passed between the tempering and the stationary electrode through the welded crossing, the magnitude of the tempering current IT (in amperes) is determined in accordance with the following equation:

$$IT = IW + (0 \text{ to } 500)$$

wherein IW represents the magnitude of the welding current in amperes.

* * * * *